(12) United States Patent
Asakura

(10) Patent No.: US 11,310,449 B2
(45) Date of Patent: Apr. 19, 2022

(54) SOLID-STATE IMAGING DEVICE AND ELECTRONIC APPARATUS

(71) Applicant: SONY SEMICONDUCTOR SOLUTIONS CORPORATION, Kanagawa (JP)

(72) Inventor: Luonghung Asakura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/972,172

(22) PCT Filed: Mar. 26, 2019

(86) PCT No.: PCT/JP2019/012639
§ 371 (c)(1),
(2) Date: Dec. 4, 2020

(87) PCT Pub. No.: WO2019/239675
PCT Pub. Date: Dec. 19, 2019

(65) Prior Publication Data
US 2021/0243392 A1 Aug. 5, 2021

(30) Foreign Application Priority Data
Jun. 12, 2018 (JP) .............................. JP2018-111778

(51) Int. Cl.
*H04N 5/357* (2011.01)
*H04N 5/374* (2011.01)
(Continued)

(52) U.S. Cl.
CPC ............. *H04N 5/357* (2013.01); *H04N 5/374* (2013.01); *H04N 5/378* (2013.01)

(58) Field of Classification Search
CPC ........ H04N 5/357; H04N 5/374; H04N 5/378; G11C 5/14; G11C 5/147; G06F 3/04182;
(Continued)

(56) References Cited

U.S. PATENT DOCUMENTS 7,787,036 B2 * 8/2010 Egawa ................. H04N 5/3572
348/251
9,515,115 B2 * 12/2016 Maruyama ............ H01L 27/146
(Continued)

FOREIGN PATENT DOCUMENTS

JP 2012-191379 A 10/2012
JP 2014-207631 A 10/2014
(Continued)

OTHER PUBLICATIONS

International Search Report and Written Opinion of PCT Application No. PCT/JP2019/012639, dated Jun. 18, 2019, 07 pages of ISRWO.

*Primary Examiner* — Marly S Camargo
(74) *Attorney, Agent, or Firm* — Chip Law Group

(57) ABSTRACT

Provided is a new solid-state imaging device and electronic apparatus capable of eliminating streaking. Provided is a solid-state imaging device including: plurality of pixels provided in a pixel region on a substrate in a matrix form; a plurality of first wirings commonly provided to each of the plurality of pixels arranged along a first direction; a second wiring capacitively coupled to each of the plurality of first wirings; and a second detection unit that is electrically connected to the second wiring and detects a second signal appearing on the second wiring.

19 Claims, 12 Drawing Sheets

(51) Int. Cl.
  *H04N 5/378* (2011.01)
  *G11C 5/14* (2006.01)
  *G06F 11/00* (2006.01)
  *G06F 3/041* (2006.01)

(58) Field of Classification Search
  CPC .... G06F 11/002; G06F 2119/10; G06T 5/002;
      G06T 5/003; G06T 2207/20182; H01L
        2924/14253; H01L 2924/14335
  USPC .......... 348/241, 308, 533, 607; 257/69, 291,
        257/292, 204, 372, 386, 394, 503, 547,
            257/665, 293; 250/208.1
  See application file for complete search history.

(56) References Cited

U.S. PATENT DOCUMENTS

| | | | |
|---|---|---|---|
| 9,715,021 B2* | 7/2017 | Watanabe | H01L 27/146 |
| 2010/0091160 A1* | 4/2010 | Murakami | H04N 9/64 |
| | | | 348/245 |
| 2015/0179693 A1* | 6/2015 | Maruyama | H01L 27/146 |
| 2016/0041276 A1 | 2/2016 | Kawanabe et al. | |
| 2016/0117020 A1* | 4/2016 | Takemura | G06C 3/042 |
| 2016/0299239 A1 | 10/2016 | Watanabe et al. | |
| 2016/0343452 A1* | 11/2016 | Ikeda | G11C 27/024 |
| 2017/0270405 A1* | 9/2017 | Kurokawa | G06N 3/0635 |
| 2017/0301376 A1* | 10/2017 | Kurokawa | G11C 5/063 |
| 2021/0096678 A1* | 4/2021 | Kubota | G06F 3/0412 |

FOREIGN PATENT DOCUMENTS

| | | |
|---|---|---|
| JP | 2016-039463 A | 3/2016 |
| JP | 2016-201665 A | 12/2016 |

\* cited by examiner

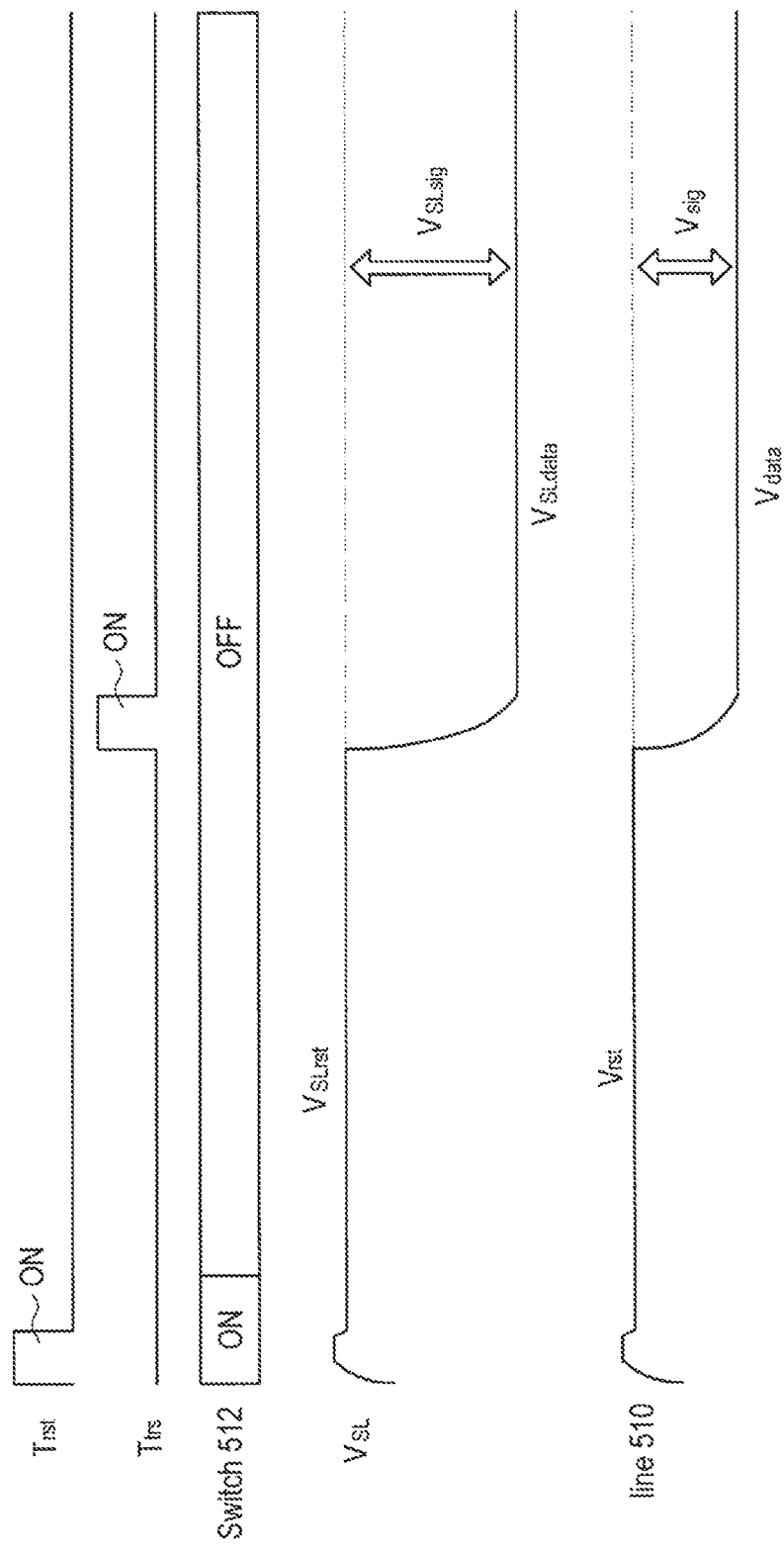

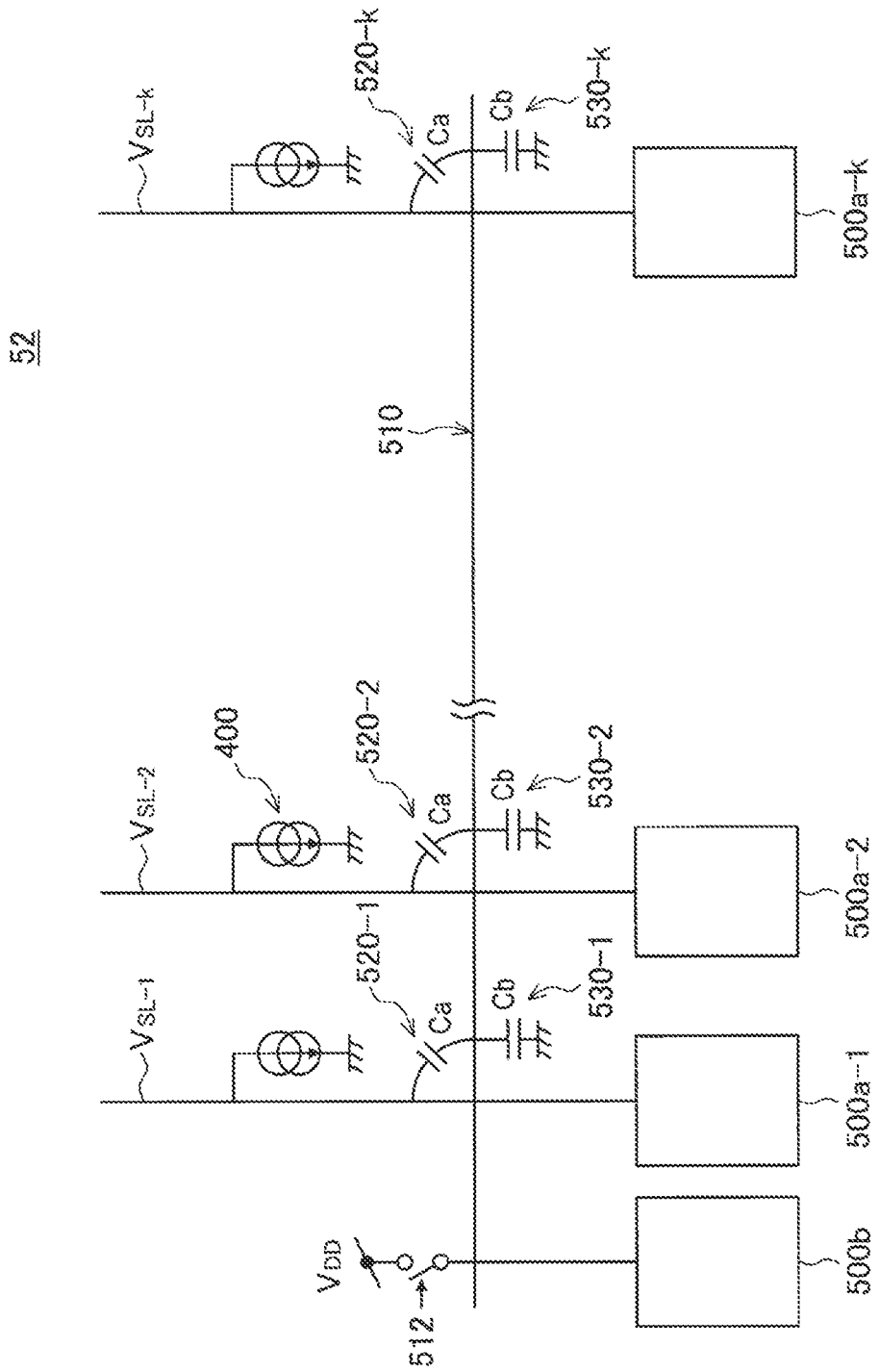

SOLID-STATE IMAGING DEVICE AND ELECTRONIC APPARATUS

CROSS REFERENCE TO RELATED APPLICATIONS

This application is a U.S. National Phase of International Patent Application No. PCT/JP2019/012639 filed on Mar. 26, 2019, which claims priority benefit of Japanese Patent Application No. JP 2018-111778 filed in the Japan Patent Office on Jun. 12, 2018. Each of the above-referenced applications is hereby incorporated herein by reference in its entirety.

FIELD

The present disclosure relates to a solid-state imaging device and an electronic apparatus.

BACKGROUND

For example, in a complementary metal oxide semiconductor (CMOS) image sensor (solid-state imaging device), column signal processing units common to each of a plurality of pixels arranged in a column direction are provided. The column signal processing unit performs signal processing, such as analog-digital (A/D) conversion, on a pixel signal output from a pixel and outputs an output signal. The column signal processing unit as described above shares a power line, a ground line, a bias line, and the like between a plurality of pixels that are not directly electrically connected to the column signal processing unit. Therefore, pixel signals from the plurality of pixels that are not directly electrically connected to the column signal processing unit may unintentionally appear as noise in the column signal processing unit via the wiring described above. As a result, the noise may cause streaking in an output image obtained by the output signal converted by the column signal processing unit.

Therefore, a configuration for correcting such streaking has been proposed. As the configuration, for example, the technology disclosed in Patent Literature 1 described below can be cited. In the configuration, there are provided a normal pixel region in which normal pixels are arranged in a matrix form and a horizontal optical black (HOPB) region in which a plurality of light-shielded HOPB pixels are arranged so that the normal pixel region is sandwiched between the left and right of the HOPB region. Then, the column signal processing unit reads both the pixel signal from the normal pixel and the pixel signal from the HOPB pixel, and a correction processing unit performs processing of subtracting an output signal from the HOPB pixel as a reference signal from an output signal from the normal pixel. By performing such subtraction processing, it is possible to eliminate the streaking that is common to the normal pixel and the HOPB pixel, and thus it is possible to correct the streaking.

CITATION LIST

Patent Literature

Patent Literature 1: Japanese Laid-open Patent Publication No. 2014-207631

SUMMARY

Technical Problem

However, according to the above configuration, since the HOPB region is provided, it is difficult to suppress an increase in a chip area of a semiconductor chip on which an image sensor (solid-state imaging device) is mounted or an increase in power consumption of the image sensor. In addition, since there are cases where streaking cannot be corrected, the configuration using HOPB region was not satisfactory as means to eliminate the streaking.

Therefore, in view of the above situation, the present disclosure proposes a novel and improved solid-state imaging device and electronic apparatus capable of eliminating streaking.

Solution to Problem

According to the present disclosure, a solid-state imaging device is provided that includes: a plurality of pixels provided in a pixel region on a substrate in a matrix form; a plurality of first wirings commonly provided to each of the plurality of pixels arranged along a first direction; a second wiring capacitively coupled to each of the plurality of first wirings; and a second detection unit that is electrically connected to the second wiring and detects a second signal appearing on the second wiring.

Moreover, according to the present disclosure, an electronic apparatus comprising a solid-state imaging device is provided, wherein the solid-state imaging device includes: a plurality of pixels provided in a pixel region on a substrate in a matrix form; a plurality of first wirings commonly provided to each of the plurality of pixels arranged along a first direction; a second wiring capacitively coupled to each of the plurality of first wirings; and a second detection unit that is electrically connected to the second wiring and detects a second signal appearing on the second wiring.

Advantageous Effects of Invention

As described above, according to the present disclosure, it is possible to provide a novel solid-state imaging device and electronic apparatus capable of eliminating streaking.

Note that the above effects are not necessarily limited, and in addition to or in place of the above effects, any of the effects disclosed in this specification, or other effects that can be grasped from this specification may be achieved.

BRIEF DESCRIPTION OF DRAWINGS

FIG. 6 is an explanatory diagram for explaining a reading method in the detection unit 52 according to the embodiment of the present disclosure.

FIG. 7A is an explanatory diagram for explaining coupling capacitors 520 and 530 in the detection unit 52 according to the embodiment of the present disclosure.

DESCRIPTION OF EMBODIMENTS

Figure 1A:
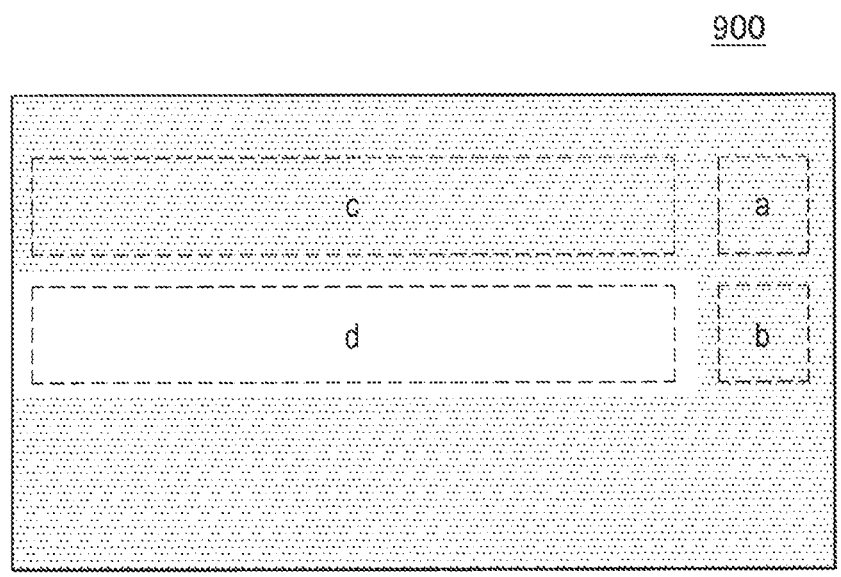
FIG. 1A is an explanatory diagram illustrating an example of an input image 900 input to an image sensor.

Hereinafter, preferred embodiments of the present disclosure will be described in detail with reference to the accompanying drawings. Note that in the specification and the drawings, components having substantially the same functional configuration are denoted by the same reference numerals, and a redundant description thereof is omitted.

In addition, in this specification and the drawings, a plurality of components having substantially the same or similar functional configuration may be distinguished from each other by attaching different numbers after the same reference numeral. However, when it is not necessary to particularly distinguish each of a plurality of components having substantially the same functional configuration, the plurality of components are denoted by only the same reference numerals. Further, similar components of different embodiments may be distinguished from each other by attaching different alphabets after the same reference numerals. However, if there is no particular need to distinguish between similar components, only the same numerals are attached.

The drawings referred to in the following description are diagrams for explaining the embodiment of the present disclosure and for facilitating the understanding thereof, and for the sake of clarity, shapes, dimensions, ratios, and the like illustrated in the drawings are substantially different. Therefore, the design of the image sensor and the like illustrated in the drawings can be appropriately changed in consideration of the following description and known technologies.

Furthermore, in the following description of the circuit configuration, unless otherwise specified, "connection" means electrical connection between a plurality of elements.

Furthermore, "connection" in the following description refers not only to the case where a plurality of elements are directly and electrically connected but also to the case where the plurality of elements are indirectly and electrically connected through another element.

Further, in the following description, "gate" refers to a gate electrode of a field effect transistor (FET). "Drain" refers to a drain electrode or a drain region of the FET, and "source" refers to a source electrode or a source region of the FET.

In addition, the description will be given in the following order.

1. Background from which the present inventor creates embodiments of the present disclosure
2. Embodiments of the present disclosure
2.1 Schematic configuration of image sensor 10
2.2 Detailed configuration of detection unit 52
2.3 Coupling capacitor 520 and the like
2.4 Layout of column signal processing unit 500b
3. Summary
4. Application example to electronic apparatus
5. Supplement 1. BACKGROUND FROM WHICH THE PRESENT INVENTOR CREATES EMBODIMENTS OF THE PRESENT DISCLOSURE First, before describing the details of embodiments of the present disclosure, the background from which the present inventor created the embodiments of the present disclosure will be described.

As described above, a CMOS image sensor is provided with a column signal processing unit common to a plurality of pixels arranged in the column direction. The column signal processing unit performs signal processing, such as analog-digital (A/D) conversion, on a pixel signal output from a pixel and outputs an output signal. The column signal processing unit as described above shares a power line, a ground line, a bias line, and the like between a plurality of pixels that are not directly electrically connected to the column signal processing unit. Therefore, pixel signals from the plurality of pixels that are not directly electrically connected to the column signal processing unit may unintentionally appear as noise in the column signal processing unit via the wiring described above. As a result, the noise may cause streaking in an output image obtained by the output signal converted by the column signal processing unit. Here, streaking refers to, for example, a phenomenon in which a region to be a black ground adjacent to a white region is displayed in gray in an output image in which there is the white region in the black ground. That is, the streaking refers to an image different from a real image appearing in the output image.

Figure 1B:
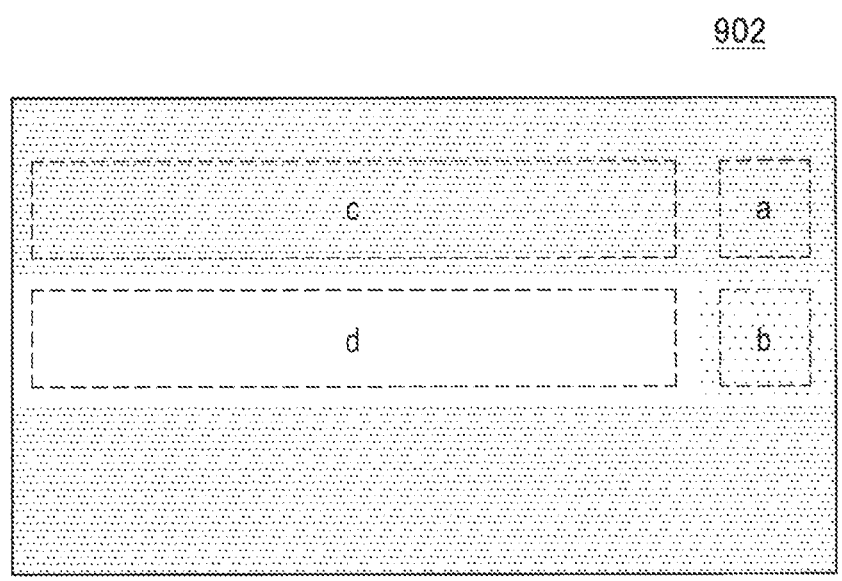
FIG. 1B is an explanatory diagram illustrating an example of an output image 902 after digital conversion of the image sensor.

Here, details of the streaking phenomenon will be described with reference to FIGS. 1A and 1B. FIG. 1A is an explanatory diagram illustrating an example of an input image 900 input to a CMOS image sensor, and FIG. 1B is an explanatory diagram illustrating an example of an output image 902 after digital conversion of the CMOS image sensor.

For example, the input image 900 illustrated in FIG. 1A is assumed to include region a, region b, region c, and region d. In the input image 900, levels of input signals input to pixels included in the region a and the region b are assumed to be the same. On the other hand, in the input image 900, it is assumed that there is a large difference in levels of input signals input to pixels included in each region of the region c located next to the region a and the region d located next to the region b. Specifically, a level of the input signal input to the pixel included in the region c is low, and the level of the input signal input to the pixel included in the region d is high.

Therefore, the column signal processing unit sequentially reads pixel signals from the plurality of pixels on a row-by-row basis for each of the plurality of pixels to which the input image as described above, and converts the read pixel signals into digital signals. At this time, the pixel signal from the pixel included in region c unintentionally appears as noise in the column signal processing unit connected to the pixel included in the region a, and the pixel signal from the pixel included in region d unintentionally appears as noise in the column signal processing unit connected to the pixel included in the region b.

As described above, the input signal of the pixel included in the region a and the input signal of the pixel included in the region b have the same signal level. Therefore, originally, even in the output image 902, the output signal obtained by converting the pixel signal from the pixel included in the region a and the output signal obtained by converting the pixel signal from the pixel included in the region b need to have the same signal level. However, as illustrated in the output image 902 of FIG. 1B, a difference may occur in the signal levels of the output signals obtained by converting the converted pixel signals of the pixels included in the region a and the region b. Specifically, due to a degree of signal interference via a power supply line or the difference between the level of the input signal of the pixel included in the region c and the level of the input signal of the pixel included in the region d, a signal level of noise from the pixel of the region c to the column signal processing unit of the region a and a signal level of noise from the pixel of the region d to the column signal processing unit of the region b may be different. As a result, there is a difference between the signal level of the output signal from the column signal processing unit in the region a and the signal level of the output signal from the column signal processing unit in the region b due to the noise, and as illustrated in FIG. 1B, the output image 902 including the region b (that is, streaking) different from the real image is output. Since such streaking is easily recognized by human eyes, it is necessary to eliminate the streaking. In the following description, the difference between the streaking and the real image is called a streaking amount (noise amount).

In order to suppress the occurrence of such streaking, it is conceivable to enhance an impedance of a power line, a ground line, a bias line, and the like shared between the pixel and the column signal processing unit. In addition, it is conceivable to adopt a layout that avoids the occurrence of unintentional capacitive coupling, which may be a path for signal interference in the power supply line and the like. However, in order to strengthen the wiring impedance, it is necessary to provide a wide wiring region, and it is difficult to avoid an increase in a chip area of a semiconductor chip on which the image sensor (solid-state imaging device) is mounted. Also, regarding the layout that avoids the occurrence of the capacitive coupling, it is difficult to perform the optimal layout to avoid the occurrence due to restrictions on the degree of freedom of layout due to the circuit configuration or other circuit blocks, and it is difficult to completely eliminate the streaking.

Figure 2:
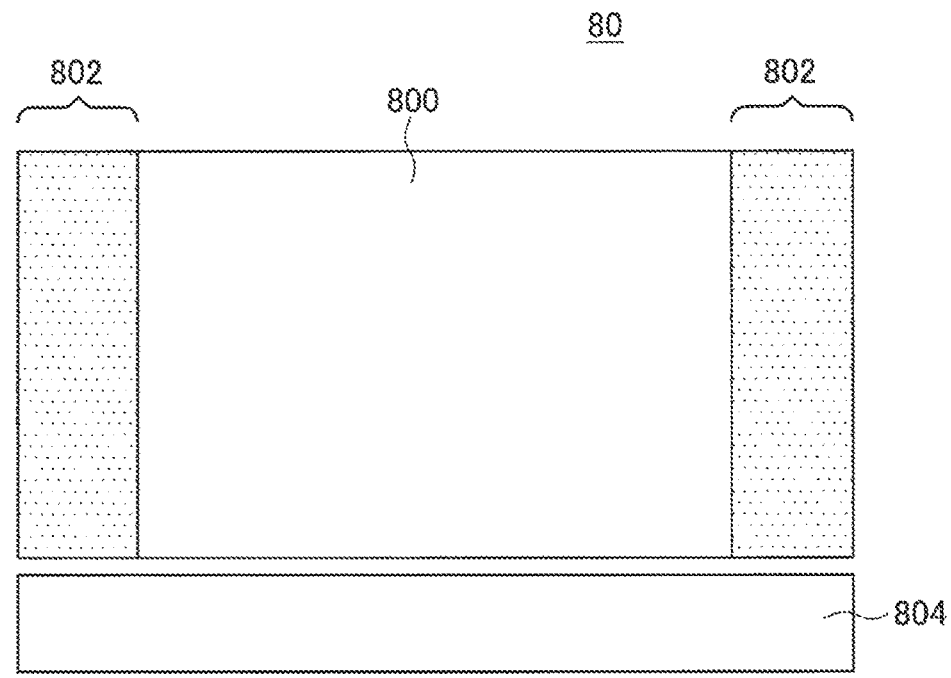
FIG. 2 is a layout diagram of an image sensor 80 according to a comparative example.

Therefore, instead of the method described above, a configuration has been proposed in which the streaking amount is corrected during the digital conversion to eliminate the streaking (for example, the technology disclosed in Patent Literature 1 can be cited). The configuration for eliminating the streaking by correction will be described below with reference to FIG. 2. FIG. 2 is a layout diagram of an image sensor 80 according to a comparative example, and specifically, an explanatory diagram for explaining a horizontal optical black (HOPB) region 802 according to the comparative example. Here, the comparative example means the image sensor that the present inventor has repeatedly studied before completing the embodiment of the present disclosure.

As illustrated in FIG. 2, the image sensor 80 according to the comparative example is provided with a normal pixel region 800 in which a plurality of normal pixels (not illustrated) are arranged in a matrix form. Further, in the image sensor 80 according to the comparative example, a column signal processing region 804 is provided below the normal pixel region 800 in FIG. 2. In the column signal processing region 804, a plurality of column signal processing units (not illustrated) that are common to a plurality of normal pixels arranged in a column direction (up-down direction in FIG. 2) are arranged. Furthermore, in the image sensor 80 according to the comparative example, there is provided the HOPB region 802 in which a plurality of light-shielded HOPB pixels (not illustrated) are arranged so that the normal pixel region 800 is sandwiched between the left and right of the HOPB region 802 or adjacent to one of the left and right of the HOPB region 802.

Then, in the image sensor 80, the column signal processing unit reads both the pixel signal from the normal pixel and the pixel signal from the HOPB pixel, and performs processing of subtracting an output signal from the HOPB pixel as a reference signal from an output signal from the normal pixel after the digital conversion. According to the image sensor 80 according to the comparative example, since the streaking amount common to the normal pixel and the HOPB pixel can be removed by performing the subtraction process as described above, the correction for eliminating the streaking can be performed.

However, in order to sufficiently reduce the fluctuation of the reference signal due to the element-specific random noise, it is required that the number of HOPB pixels included in the HOPB region 802 be about several hundred per one row. As a result, when the above configuration is applied, it is difficult to suppress the increase in the chip area of the semiconductor chip on which the image sensor 80 is mounted or the increase in the power consumption of the image sensor 80 even if the streaking can be eliminated.

In addition, in the above configuration, the HOPB region 802 is arranged on the left and right of the normal pixel region 800. Therefore, when the occurring streaking has location dependence in a left-right direction (row direction) due to pattern dependence of the input signal (for example, if the streaking occurs only in a specific column), the location dependence may not appear in the HOPB pixel of the HOPB region 802. As a result, even if the reference signal from the HOPB pixel is subtracted from the output signal from the normal pixel, the streaking amount remains in the output signal from the normal pixel, in other words, uncorrected residue may occur. Therefore, in order to avoid such uncorrected residue, it is considered that more HOPB regions 802 are provided in the pixel region of the image sensor 80 to be uniformly distributed in the entire pixel region so that the streaking having the location dependence can be detected even in the HOPB pixels. However, providing a large number of light-shielded HOPB pixels deteriorates the quality of the captured image obtained by the image sensor 80, and also increases the chip area of the semiconductor chip, which is not realistic.

Figure 3:
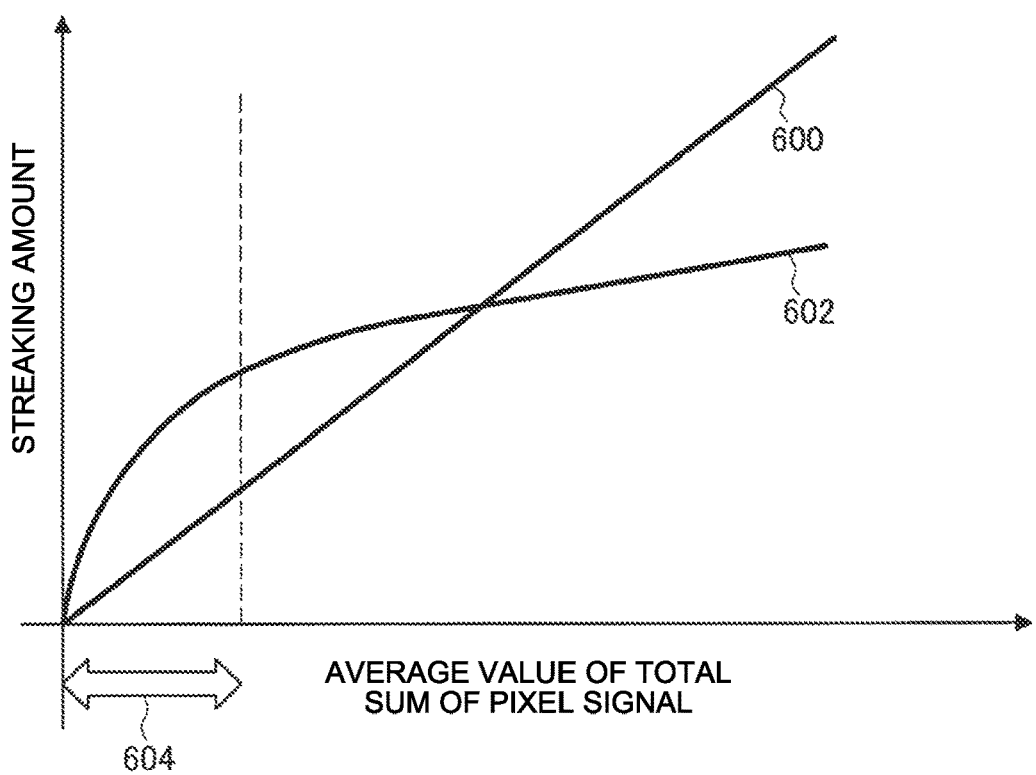
FIG. 3 is a graph illustrating a relationship of a generated streaking amount with respect to an average value of a total sum of pixel signals read from a plurality of pixels.

In view of the situation as described above, the present inventor has been intensively studying a configuration capable of performing the correction without using the HOPB pixel. Then, the present inventor has uniquely learned that the streaking amount can be estimated from an average value of a total sum of pixel signals read from a plurality of normal pixels through an independent study. Hereinafter, the relationship between the average value of the total sum of pixel signals read from the plurality of normal pixels and the streaking amount, which is uniquely known by the present inventor, will be described with reference to FIG. 3. FIG. 3 is a graph illustrating a relationship of a generated streaking amount with respect to an average value of a total sum of pixel signals read from a plurality of normal pixels.

Specifically, in FIG. 3, an X axis indicates the average value of the total sum of pixel signals read from a predetermined number of normal pixels and a Y axis indicates the streaking amount. The present inventor has been found that the relationship between the average value of the total sum of pixel signals read from the predetermined number of normal pixels and the streaking amount is often a linear relationship as illustrated by a straight line 600 in FIG. 3. Alternatively, it has been found that the relationship between the average value and the streaking amount may be a gentle curved line relationship as illustrated by a curved line 602 in FIG. 3. Then, the present inventor has found that such a relationship is obtained in advance based on the design verification result or the evaluation result of the targeted image sensor.

Then, the present inventor has conceived that the generated streaking amount can be calculated from the average value of the total sum of pixel signals read from the predetermined number of normal pixels by referring to the relationship obtained in advance. In other words, the present inventor has conceived that the occurrence of streaking is eliminated by performing the correction using the streaking amount calculated from the above average value without using the above-described HOPB pixel, that is, the output image without the region (streaking) different from the real image can be obtained.

However, when a signal larger than a range 604, which indicates a range of a signal level that the column signal processing unit can linearly digitally convert, is input to the column signal processing unit as illustrated in FIG. 3, the column signal processing unit outputs an output signal indicating that the column signal processing unit is saturated. In such a case, since the signal level of the input signal actually input to the pixel cannot be known by the output signal from the column signal processing unit, the generated streaking amount cannot be more accurately calculated from the average value of the total sum of pixel signals. In particular, an amplification degree (analog gain) for the signal input to the column signal processing unit can be adjusted as appropriate, and if the analog gain is set to be high, the column signal processing unit will be more easily saturated.

Therefore, in view of such a situation, even when the input signal larger than the above range 604 is input to the column signal processing unit, the present inventor created the embodiment of the present disclosure that the streaking amount can be more accurately calculated from the average value of the total sum of pixel signals of the normal pixels.

Hereinafter, the details of such an embodiment of the present disclosure will be sequentially described.

2. EMBODIMENTS OF THE PRESENT DISCLOSURE

<2.1 Schematic Configuration of Image Sensor 10>

Figure 4A:
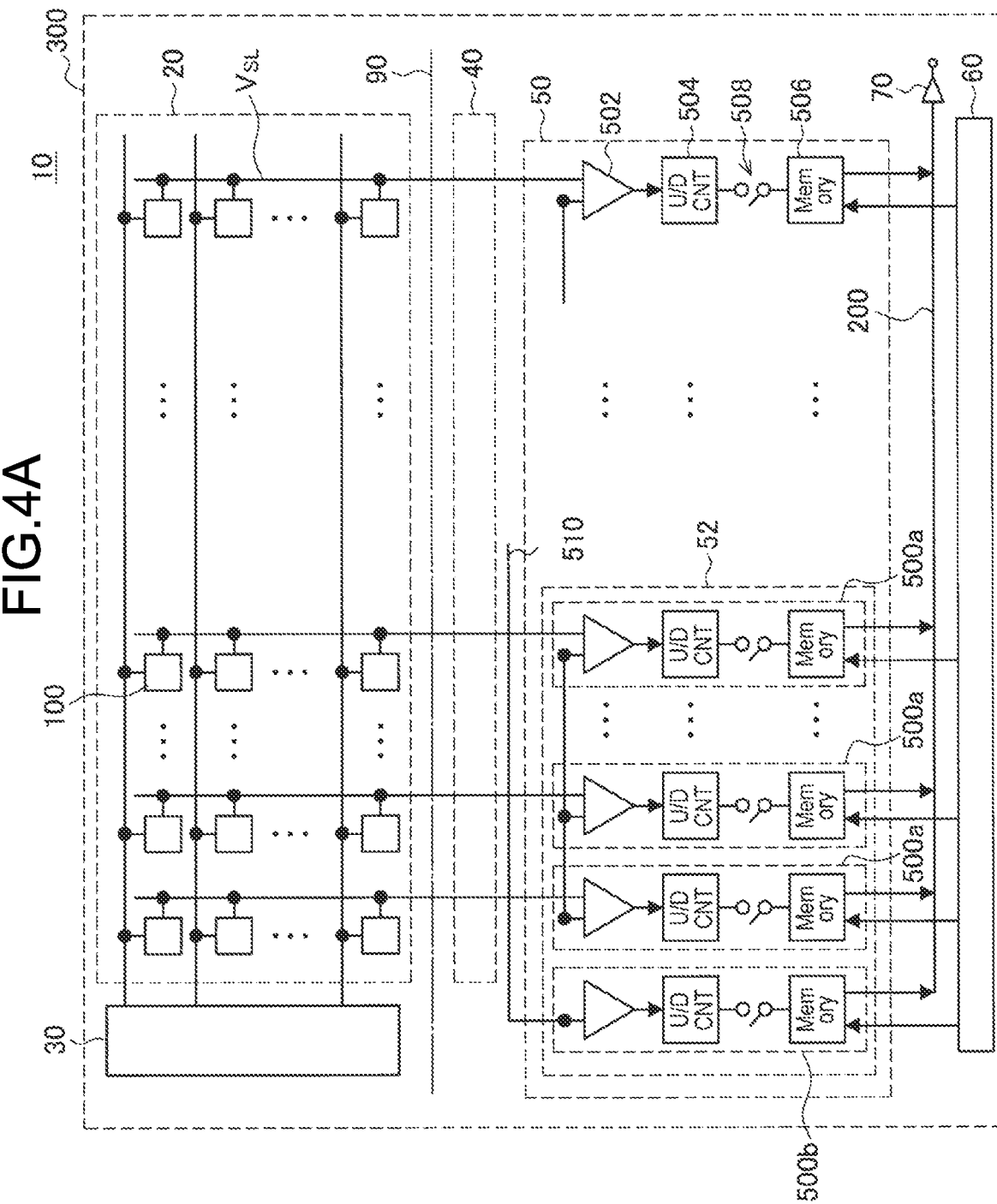
FIG. 4A is a schematic layout diagram of an image sensor 10 according to an embodiment of the present disclosure.
Figure 4B:
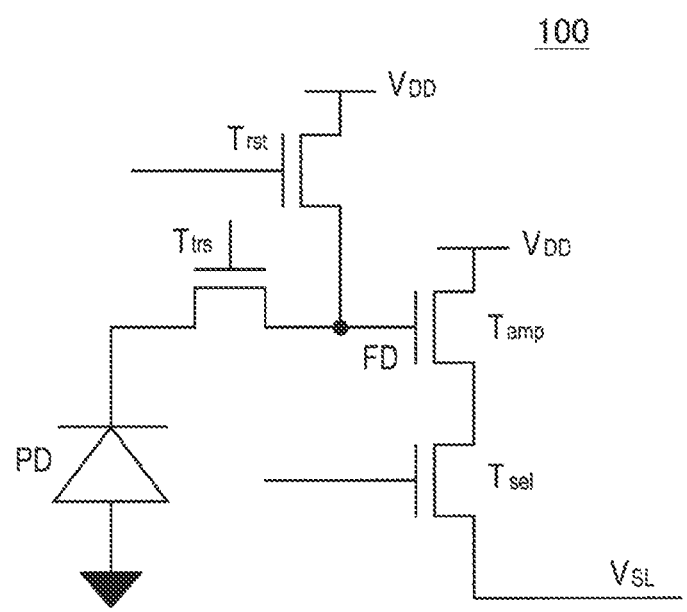
FIG. 4B is a circuit diagram illustrating an example of a circuit of pixels 100 in FIG. 4A.

First, an outline of the image sensor (solid-state imaging device) 10 according to the embodiment of the present disclosure will be described with reference to FIGS. 4A and 4B. FIG. 4A is a schematic layout diagram of the image sensor 10 according to the embodiment of the present disclosure, and FIG. 4B is a circuit diagram illustrating an example of a circuit of pixels 100 in FIG. 4A.

As illustrated in FIG. 4A, the image sensor 10 according to the present embodiment includes a pixel array region (pixel region) 20, a vertical drive circuit region 30, a load device region 40, a column signal processing region (detection unit region) 50, a horizontal drive circuit region 60, an output circuit unit (processing unit) 70, and the like, which are provided on a semiconductor substrate 300 made of, for example, silicon. Note that FIG. 4A illustrates a straight line-shaped broken line 90 extending in a left-right direction in FIG. 4A, but a region (specifically, pixel array region 20 and vertical drive circuit region 30) illustrated on the upper side of FIG. 4A from the broken line 90 and a region (specifically, load device region 40, column signal processing region 50, and horizontal drive circuit region 60) illustrated in the lower side of FIG. 4A from the broken line 90 may be provided on the same surface of the semiconductor substrate 300 or may be provided on different surfaces (first surface and second surface). In addition, the region illustrated in the upper side of FIG. 4A from the broken line 90 and the region illustrated in the lower side of FIG. 4A from the broken line 90 may be provided on different semiconductor substrates (first substrate and second substrate) stacked on each other. The details of each block of the image sensor 10 according to the present embodiment will be described below.

(Pixel Array Region 20)

The pixel array region 20 has a plurality of pixels (solid-state image sensor) 100 that are two-dimensionally arranged on the semiconductor substrate 300 in a matrix form. Specifically, as illustrated in FIG. 4B, each pixel 100 has a photoelectric conversion element (PD) and a plurality of pixels transistors (for example, metal-oxide-semiconductor (MOS) transistor). The plurality of pixels transistors can include, for example, a transfer transistor $T_{trs}$, a select transistor $T_{sel}$, a reset transistor $T_{rst}$, and an amplification transistor $T_{amp}$.

More specifically, one of PDs that receives light and generates a charge is electrically connected to one of source/drain of the transfer transistor $T_{trs}$, which transfers a charge, via a wiring. Furthermore, the other of the source/drain of the transfer transistor $T_{trs}$ (side not connected to the PD) is electrically connected to one of source/drain of the reset transistor $T_{rst}$ for resetting the accumulated charges via the wiring. Further, a gate of the transfer transistor $T_{trs}$ is electrically connected to a transfer gate line (not illustrated), and furthermore, connected to a vertical drive circuit region 30 described below. The other (side not connected to the transfer transistor $T_{trs}$) of the source/drain of the reset transistor $T_{rst}$ is electrically connected to a power supply circuit $V_{DD}$. Furthermore, a gate of the reset transistor $T_{rst}$ is electrically connected to a reset line (not illustrated) and further connected to the vertical drive circuit region 30.

Furthermore, the other (side not connected to PD) of the source/drain of the transfer transistor $T_{trs}$ is electrically connected to a gate of the amplification transistor $T_{amp}$, which amplifies (converts) a charge and outputs the charge as a pixel signal, via the wiring. A node FD connecting between the other of the source/drain of the transfer transistor $T_{trs}$, the gate of the amplification transistor $T_{AMP}$, and one of the drain/source of the reset transistor $T_{rst}$ constitutes a part of the reset transistor $T_{rst}$. The charge transferred from the PD changes a potential of the node FD and is converted into a voltage by the amplification transistor $T_{amp}$. In addition, one of source/drain of the amplification transistor $T_{amp}$ is electrically connected to one of source/drain of the select transistor $T_{sel}$, which outputs the pixel signal obtained by the conversion to a signal line (first wiring) $V_{SL}$ according to a selection signal, via the wiring. The other (side not connected to the select transistor $T_{sel}$) of the source/drain of the amplification transistor $T_{amp}$ is electrically connected to the power supply circuit $V_{DD}$. In addition, the other (side not connected to the amplification transistor $T_{amp}$) of the source/drain of the select transistor $T_{sel}$ is electrically connected to the signal line $V_{SL}$, and furthermore, is electrically connected to a column signal processing unit 500a of the column signal processing region 50 described below. In addition, the gate of the select transistor $T_{sel}$ is electrically connected to a selection line (not illustrated) and furthermore, electrically connected to the vertical drive circuit region 30. That is, the charge from the PD is converted into a pixel signal (pixel voltage signal) by a source follower circuit constituted by the amplification transistor Tamp and a constant current source, and reads to the column signal processing unit 500a via the signal line $V_{SL}$.

Note that as illustrated in FIG. 4A, the signal line $V_{SL}$ extends along the up-down direction (column direction, first direction) in FIG. 4A, and is provided in each of the plurality of pixels 100 arranged along the up-down direction in common (that is, electrically connected to these pixels 100). Furthermore, the signal line $V_{SL}$ extends to the column signal processing unit 500a in the column signal processing region 50.

(Vertical Drive Circuit Region 30)

The vertical drive circuit region 30 is provided adjacent to the pixel array region 20. In addition, the vertical drive circuit region 30 is formed by, for example, a shift register, selects a selection line (not illustrated) for driving the pixels 100, supplies a pulse for driving the pixels 100 to the selected selection line, and drives the pixels 100 in units of row (left-right direction in FIG. 4A). That is, the vertical drive circuit region 30 selectively scans each pixel 100 of the pixel array region 20 sequentially in the vertical direction (up-down direction in FIG. 4A) on a row-by-row basis and supplies a pixel signal based on a charge generated depending on a light receiving amount of PDs of each pixel 100 to the column signal processing unit 500a described below via the signal line $V_{SL}$.

(Load Device Region 40)

In the load device region 40, for example, a plurality of load devices 400 (see FIG. 5) constituted by a MOS transistor are provided so as to be arranged on the semiconductor substrate 300, and these load devices 400 are electrically connected to the signal line $V_{SL}$ and functions as the constant current source.

(Column Signal Processing Region 50)

The column signal processing region 50 is provided with a plurality of column signal processing units (first detection units) 500a arranged for each column of the pixels 100 (up-down direction in FIG. 4A), and performs signal processing on a pixel signal (first signal), which is output from the pixels 100 of one row and input via the signal line $V_{SL}$, for each pixel column. For example, the column signal processing unit 500a can function as an analog-digital (A/D) converter.

The column signal processing unit 500a includes a comparator 502 that compares the pixel signal (analog signal), which is output from the pixels 100 of one row and is input via the signal line $V_{SL}$, with a reference voltage, an up/down counter 504 (denoted as U/D CNT in FIG. 4A) that counts a comparison output of the comparator 502, and a memory 506 that holds a count value. That is, the column signal processing unit 500a has a function of converting the analog signals applied from the pixels 100 into N-bit digital signals.

The comparator 502 compares a signal voltage corresponding to the pixel signals output from each pixel 100 with the reference voltage, and for example, performs an output of an "H" level when the reference voltage is higher than a signal voltage, and performs an output of an "L" level when the reference voltage is equal to or lower than the signal voltage. In addition, the up/down counter 504 is an asynchronous counter, and measures a comparison period from a start of a comparison operation in the comparator 502 to an end of the comparison operation by performing down count or up count. A transfer switch 508 becomes a turned on (closed) state when the count operation of the up/down counter 504 for the pixels 100 of a certain row is completed under the control of a control signal, and transfers the count result of the up/down counter 504 to the memory 506.

In this way, the analog signal supplied from each pixel 100 to each column via the signal line $V_{SL}$ is converted into an N-bit digital signal by each operation of the comparator 502 and the up/down counter 504 in the column signal processing unit 500a, and is stored in the memory 506.

Note that in the column signal processing region 50 illustrated in FIG. 4A, the column signal processing units 500a are arranged side by side in the left-right direction (row direction) in FIG. 4A, but the present embodiment is not limited thereto. For example, in the present embodiment, the column signal processing units 500a may be provided in multiple stages along the up-down direction (column direction) in FIG. 4A. By doing so, the signal processing can be performed at higher speed.

Furthermore, in FIG. 4A, the column signal processing unit 500b which is an analog-digital converter having the same circuit configuration as the column signal processing unit 500a is provided to be adjacent to the column signal processing unit 500a arranged in the left-right direction in FIG. 4A. Unlike the column signal processing unit 500a, the column signal processing unit 500b is electrically connected to a detection wiring (second wiring) 510, instead of being electrically connected to the signal line $V_{SL}$ of each pixel 100. Further, the detection wiring 510 electrically connected to the column signal processing unit 500b is provided to intersect a predetermined number (for example, several hundred to several thousand) of signal lines $V_{SL}$ without being electrically connected (in insulated state from each signal line $V_{SL}$). Note that in this embodiment, the column signal processing unit 500b electrically connected to one detection wiring 510 and a predetermined number of column signal processing units 500a electrically connected to a predetermined number of signal lines $V_{SL}$ intersecting the detection wiring 510 are called a detection unit 52. In FIG. 4A, in the detection unit 52, the column signal processing unit 500b is provided on one side of the plurality of column signal processing units 500a, but the present embodiment is not limited thereto. For example, in the present embodiment, the plurality of column signal processing units 500b may be provided so as to sandwich the plurality of column signal processing units 500a from both sides. Note that the details of the detection unit 52 according to the present embodiment will be described below.

(Horizontal Drive Circuit Region 60)

The horizontal drive circuit region 60 is constituted by, for example, a shift register, and sequentially outputs horizontal scanning pulses to sequentially select each of the above-described column signal processing units 500a and output the output signals from each of the column signal processing units 500a to a horizontal signal line 200.

(Output Circuit Unit 70)

An output circuit unit 70 can perform signal processing on output signals sequentially supplied from each of the above-described column signal processing units 500a via the horizontal signal line 200 and output the processed signals. The output circuit unit 70 may function, for example, as a functional unit that performs buffering, or may perform various correction processing. Note that the buffering refers to temporarily storing signals in order to compensate for differences in a processing speed and a transfer speed when exchanging signals.

In addition, the output circuit unit 70 may have a correction processing unit that estimates the streaking amount based on the signal (signal amount) obtained by the column signal processing unit 500b (second detection unit) described below, and uses the estimated streaking amount to correct the signal obtained by the column signal processing unit 500a.

Note that a layout configuration example of the image sensor 10 according to the present embodiment is not limited to the example illustrated in FIG. 4A, and may include, for example, other circuit units and the like, and is not particularly limited.

<2.2 Detailed Configuration of Detection Unit 52>

Figure 5:
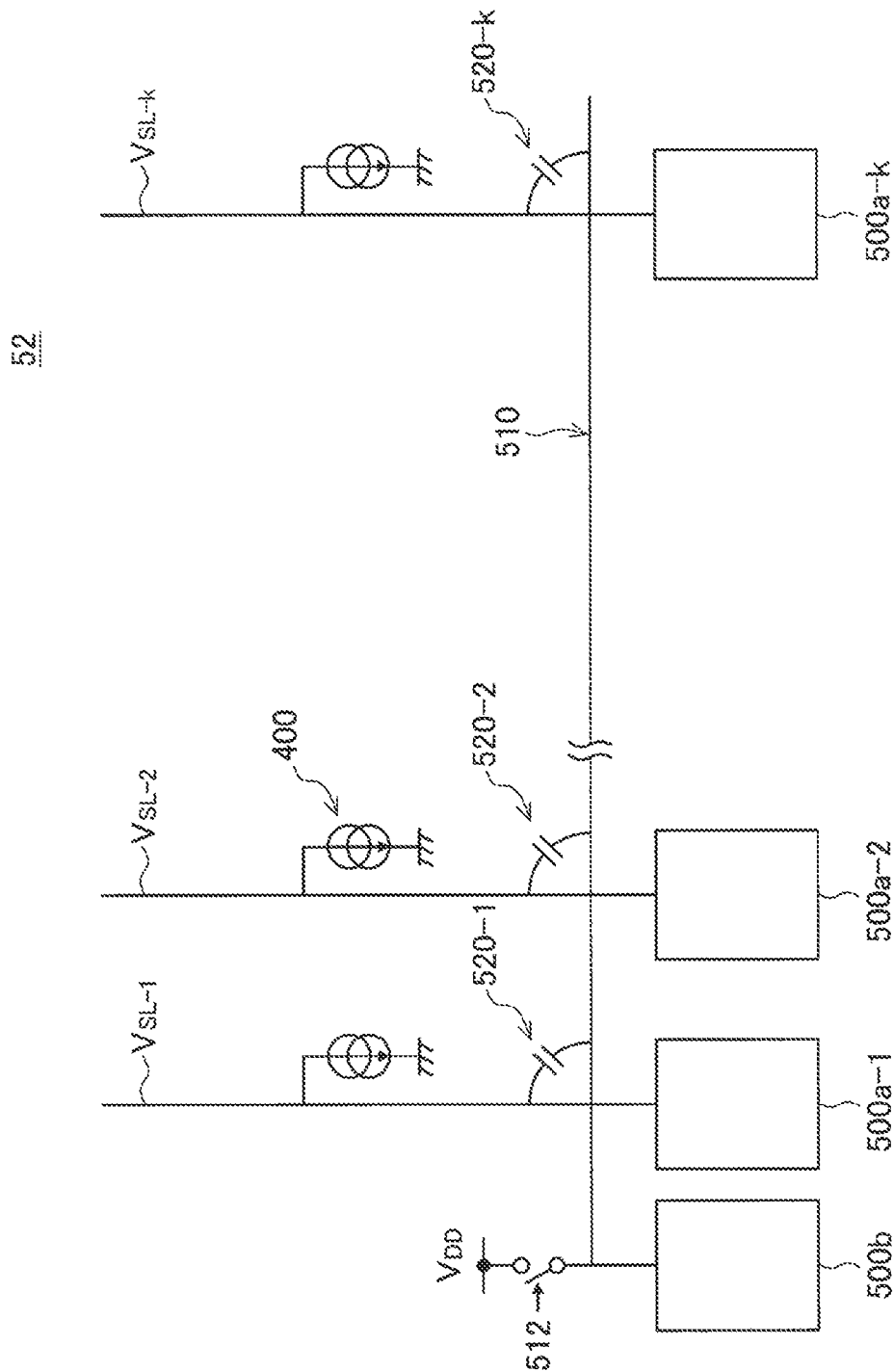
FIG. 5 is an explanatory diagram illustrating an example of a detailed configuration of a detection unit 52 according to the embodiment of the present disclosure.

The outline of the image sensor 10 according to the present embodiment has been described above. Next, a detailed configuration of the detection unit 52 according to the present embodiment will be described with reference to FIGS. 5 and 6. FIG. 5 is an explanatory diagram illustrating an example of a detailed configuration of the detection unit 52 according to the present embodiment, and FIG. 6 is an explanatory diagram for explaining a reading method in the detection unit 52 according to the present embodiment.

As illustrated in FIG. 5, as described above, the detection unit 52 according to the present embodiment is provided with k column signal processing units 500a-1, 500a-2, ..., 500a-k electrically connected to k signal lines (first wirings) $V_{SL}$-1, $V_{SL}$-1, ..., $V_{SL}$-k which extend in the up-down direction (column direction, first direction) in FIG. 5 (K is an arbitrary natural number). In addition, a load device 400 functioning as a constant current source is electrically connected to each signal line $V_{SL}$-1, $V_{SL}$-1, ..., $V_{SL}$-k.

Furthermore, in the present embodiment, as described above, the column signal processing unit 500b is provided so as to be adjacent to the plurality of column signal processing units 500a-1, 500a-2, ..., 500a-k. The column signal processing unit (second detection unit) 500b performs the signal processing such as AD conversion on the input signal (second signal), similar to the above-described column signal processing unit 500a. For example, the column signal processing unit 500b has the same circuit configuration as the column signal processing unit 500a. However, unlike the other column signal processing unit 500a, the column signal processing unit 500b is not electrically connected to the signal line $V_{SL}$. Instead, the column signal processing unit 500b is electrically connected to the detection wiring 510. The detection wiring 510 is, for example, extended in a direction orthogonal to the direction in which the signal line $V_{SL}$ extends, that is, in the left-right direction (row direction, second direction) in FIG. 5, and intersects each signal line $V_{SL}$-1, $V_{SL}$-1, ..., $V_{SL}$-k without being electrically connected to $V_{SL}$-k. Furthermore, the detection wiring 510 is capacitively coupled to each of the signal lines $V_{SL}$-1, $V_{SL}$-1, ..., $V_{SL}$-k, and forms each coupling capacitor (first coupling capacitor 520-1, 520-2, ..., 520-k. Further, the column signal processing unit 500b and the detection wiring 510 are electrically connected to a power supply $V_{DD}$ or a bias circuit (not illustrated) via a switch 512.

In the present embodiment, since the detection wiring 510 is capacitively coupled to each signal line $V_{SL}$-1, $V_{SL}$-1, ..., $V_{SL}$-k, the potential of the detection wiring 510 fluctuates by the pixel signals from the pixels 100 that appear on each signal line $V_{SL}$-1, $V_{SL}$-1, ..., $V_{SL}$-k. Furthermore, the column signal processing unit 500b can detect the potential of the detection wiring 510. That is, in the present embodiment, the total sum of the pixel signals appearing on each signal line $V_{SL}$-1, $V_{SL}$-1, ..., $V_{SL}$-k can be detected by the column signal processing unit 500b. Then, in the present embodiment, the total sum of the respective pixel signals appearing on each signal line $V_{SL}$-1, $V_{SL}$-1, ..., $V_{SL}$-k detected by the column signal processing unit 500b is used, and as a result, the generated streaking amount can be more accurately calculated by the method described above.

In detail, the total sum of the pixel signals appearing on each signal line $V_{SL}$-1, $V_{SL}$-1, ..., $V_{SL}$-k can be read from the column signal processing unit 500b as follows.

First, as illustrated in FIG. 6, the switch 512 is turned on at a head of a horizontal period, so the potential of the detection wiring 510 is reset to a reference voltage $V_{rst}$. After that, the switch 512 is turned off, so the detection wiring 510 becomes a high impedance state.

As for the operation on the pixel 100 side, the select transistor $T_{sel}$ of the pixel 100 in the target row is turned on. Further, the reset transistor $T_{rst}$ of the pixel 100 is turned on, so the accumulated charge is reset. Thereafter, the transfer transistor $T_{trs}$ of the pixel 100 is turned on, so the accumulated charge is converted into a voltage signal. The voltage signal causes the potential of each signal line $V_{SL}$ to change from $V_{SLrst}$ to $V_{SLdata}$. Note that the column signal processing unit 500a outputs a signal amplitude $V_{SLsig}$ which is a differential voltage between $V_{SLrst}$ and $V_{SLdata}$.

Furthermore, in the present embodiment, voltage signals appearing on each signal lines $V_{SL}$-1, $V_{SL}$-1, ..., $V_{SL}$-k fluctuates the potential of the detection wiring 510 in the high impedance state via the coupling capacitors 520-1, 520-2, ..., 520-k. As a result, the potential of the detection wiring 510 changes from $V_{rst}$ to $V_{data}$. Therefore, the column signal processing unit 500b outputs a signal amplitude $V_{sig}$, which is a differential voltage between $V_{rst}$ and $V_{data}$, as the total sum of each pixel signal appearing on each signal line $V_{SL}$-1, $V_{SL}$-1, ..., $V_{SL}$-k. Note that the details of the relationship between the signal amplitude $V_{SLsig}$ and the signal amplitude $V_{sig}$ will be described later.

As described above, in the present embodiment, since the detection wiring 510 is capacitively coupled to each of the plurality of signal lines $V_{SL}$, the potential of the detection wiring 510 fluctuates by the pixel signals from the pixels 100 appearing on each signal line $V_{SL}$. Therefore, according to the present embodiment, the total sum of each pixel signals appearing on each signal line $V_{SL}$ can be detected by the column signal processing unit 500b. As a result, according to the present embodiment, by using the total sum of each pixel signal appearing on each signal line $V_{SL}$ detected by the column signal processing unit 500b without using the above-described HOPB pixel, the generated streaking amount can be more accurately calculated.

Note that in this embodiment, for example, the detection wiring 510 is preferably provided so as to intersect several thousand of signal lines $V_{SL}$. Therefore, in one image sensor 10, the detection wiring 510 and the column signal processing units 500b electrically connected to the detection wiring 510 are provided in the order of 10 to several tens. Further, in the present embodiment, it is preferable that the detection wiring 510 and the column signal processing unit 500b are provided on the image sensor 10 so as to be distributed more and uniformly so that the streaking having location dependence can be detected. Since the detection wiring 510 or the column signal processing unit 500b according to the present embodiment occupies a smaller area than the HOPB region 802 described above, a larger number of detection wirings 510 or column signal processing units 500b can be provided on the image sensor 10.

However, since the total sum of pixel signals appearing on each signal line $V_{SL}$-1, $V_{SL}$-1, . . . , $V_{SL}$-k is input to the column signal processing unit 500b, it is considered that the column signal processing unit 500b can be saturated. In such a case, as described above, the column signal processing unit 500b outputs an output signal indicating that the column signal processing unit 500b is saturated, so the total sum of the actually input pixel signals that appear on each signal line $V_{SL}$ cannot be accurately known.

Therefore, in this embodiment, in order to avoid the saturation, a detection upper limit signal amount that can be detected by the column signal processing unit 500b is greater than a total value of detection upper limit signal amounts that can be detected by a predetermined number of column signal processing units 500a. Here, the predetermined number refers to the number of signal lines $V_{SL}$ to be detected by the column signal processing unit 500b, and can be set appropriately. Specifically, in this embodiment, the saturation of the column signal processing unit 500b can be avoided by controlling the capacitance value of the coupling capacitor 520 or the like related to the detection wiring 510. Details of the coupling capacitor 520 or the like according to the present embodiment will be described below.

<2.3 Coupling Capacitor 520 and the Like>

Figure 7B:
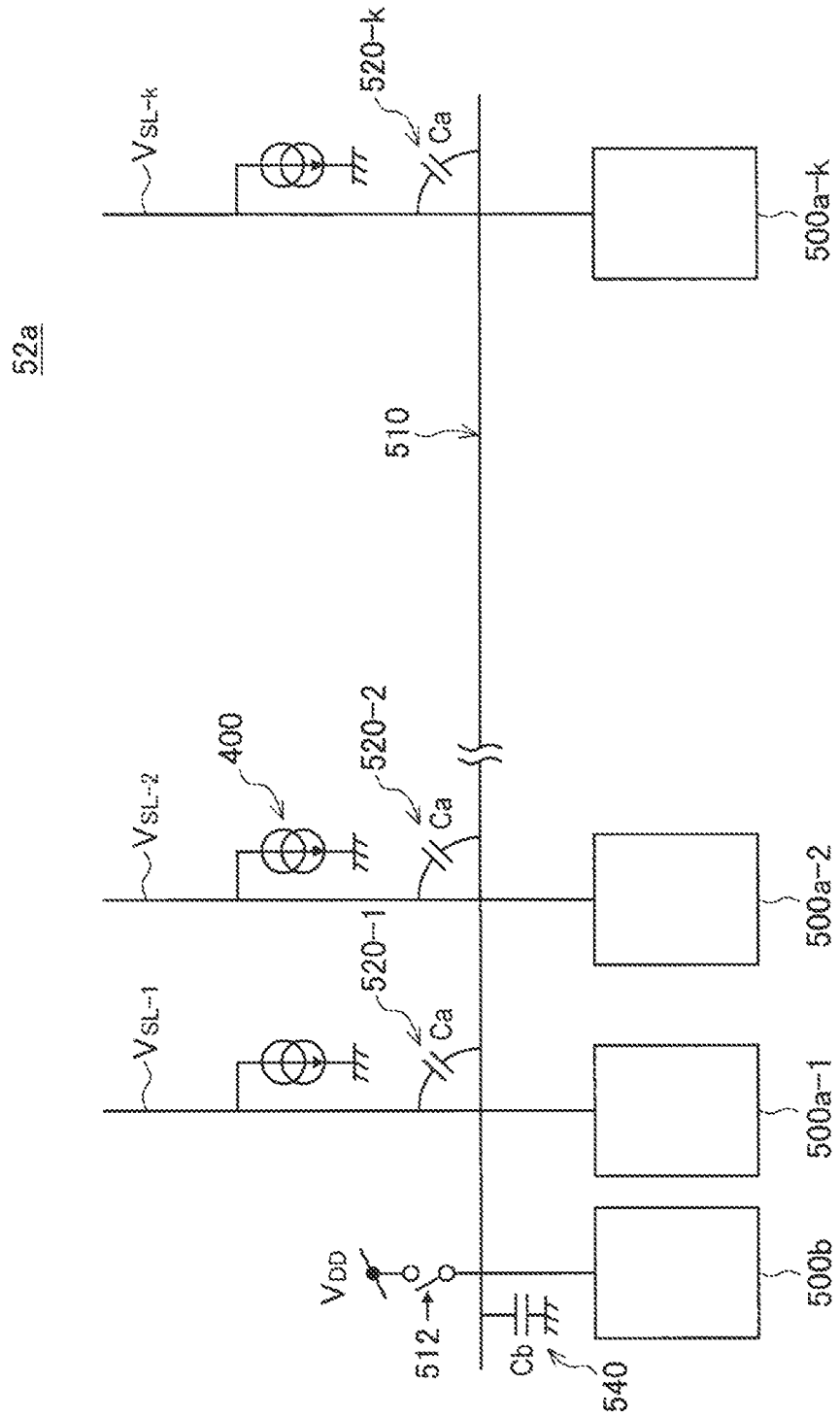
FIG. 7B is an explanatory diagram illustrating an example of a detailed configuration of a detection unit 52a according to a modification of the embodiment of the present disclosure.
Figure 8A:
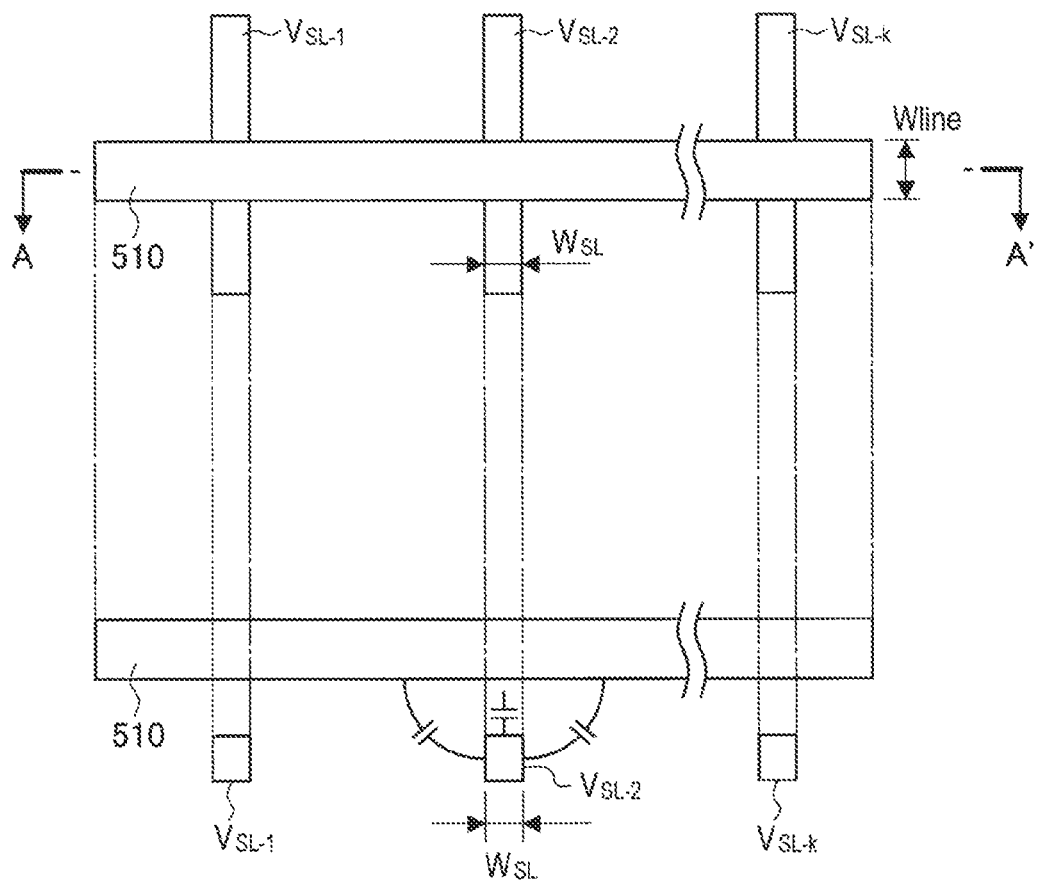
FIG. 8A is an explanatory diagram illustrating an example of a layout of a detection wiring 510 according to the embodiment of the present disclosure.
Figure 8B:
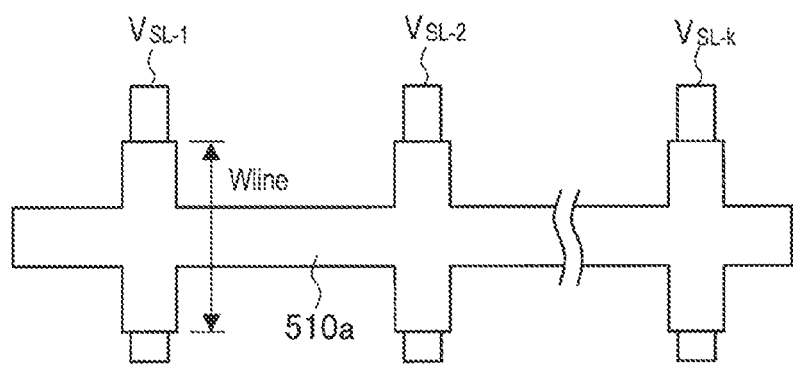
FIG. 8B is an explanatory diagram illustrating an example of a layout of a detection wiring 510a according to a modification of the embodiment of the present disclosure.

Next, details of the coupling capacitor 520 and the like according to the present embodiment will be described with reference to FIGS. 7A, 7B, 8A, and 8B. FIG. 7A is an explanatory diagram for explaining the coupling capacitors 520 and 530 in the detection unit 52 according to the present embodiment, and FIG. 7B is an explanatory diagram illustrating an example of a detailed configuration of a detection unit 52a according to the modification of the present embodiment. Further, FIG. 8A is an explanatory diagram illustrating an example of the layout of the detection wiring 510 according to the present embodiment, and in detail, illustrates a plan view and a sectional view of the detection wiring 510. Furthermore, FIG. 8B is an explanatory diagram illustrating an example of the layout of the detection wiring 510a according to a modification of the present embodiment, and in detail, illustrates a plan view and a sectional view of the detection wiring 510a.

As illustrated in FIG. 7A, one detection wiring 510 is capacitively coupled to each of the signal lines $V_{SL}$-1, $V_{SL}$-1, . . . , $V_{SL}$-k as described above and forms each coupling capacitor (first coupling capacitor) 520-1, 520-2, . . . , 520-k. Furthermore, the detection wiring 510 is capacitively coupled not only to the signal line $V_{SL}$ but also to other wirings such as a power supply line, a ground line, a bias line or the semiconductor substrate 300 and the like (third wiring), and forms each coupling capacitor 530-1, 530-2, . . . , 530-k.

Here, when the capacitance value (first capacitance value) of each coupling capacitor 520 is $C_a$ and the total sum of capacitance values $C_b$ of each coupling capacitor 530 is $C_{tb}$, a total capacitance value $C_t$ (second coupling capacitor, second capacitance value) according to the detection wiring 510 can be expressed by the following Equation (1).

$$C_t = k \times C_a + C_{tb} \qquad (1)$$

Furthermore, if a signal amplitude $V_{SLsig}(i)$ (difference between $V_{SLrst}(i)$ and $V_{SLdata}(i)$) on an i-th signal line $V_{SL}$-i is taken as the signal amplitude $V_{sig}$ (difference between $V_{rst}$ and $V_{data}$) of the detection wiring 510, the relationship between both the signal amplitudes can be expressed by the following Equation (2).

$$V_{sig} = \frac{C_a}{C_t} \sum_{i=1}^{k} V_{SLsig}(i) \qquad (2)$$

That is, the signal amplitude $V_{sig}$ of the detection wiring 510 is proportional to the total sum of the signal amplitude $V_{SLsig}$ on the signal line $V_{SL}$, and the proportional coefficient is $C_a/C_t$. Therefore, by properly designing $C_a/C_t$, the saturation of the column signal processing unit 500b can be avoided. Therefore, in order to avoid the saturation of the column signal processing unit 500b, it is preferable to reduce the capacitance values (first capacitance value) $C_a$ of each coupling capacitor 520 and increase the total sum $C_{tb}$ of the capacitance values $C_b$ of each coupling capacitor 530. For example, in the present embodiment, it is preferable that the total sum $C_{tb}$ of the capacitance values $C_b$ of the coupling capacitors 530 is greater than the capacitance values $C_a$ of each coupling capacitors 520.

Therefore, in this embodiment, in order to adjust the sum $C_{tb}$ of the capacitance values $C_b$ of each coupling capacitor 530, a plurality of capacitors (not illustrated) electrically connected to each signal line $V_{SL}$ (for example, metal insulator metal (MIM) capacitor, MOS capacitor, or the like) may be provided. Further, in the present embodiment, as in the column signal processing region 50a illustrated in FIG. 7B, one capacitor 540 (for example, MIM capacitor, MOS capacitor, or the like) electrically connected to the detection wiring 510 may be provided. In this case, the capacitance value of the capacitor 540 is, for example, about several femtofarads. In this way, when one capacitor 540 is provided as illustrated in FIG. 7B, the degree of freedom in adjusting the layout or the capacitance value $C_{tb}$ increases. For example, in the case of FIG. 7B, it is possible to easily realize the configuration in which the value of the total sum $C_{tb}$ of the capacitance values is adjusted by setting of a register according to an analog gain of the column signal processing unit 500b.

Furthermore, the coupling capacitor 520 can be considered as the MIM capacitor constituted by the detection wiring 510 and the signal line $V_{SL}$. For example, in the case of the layout illustrated in FIG. 8A, the capacitance values (first capacitance value) $C_a$ of each coupling capacitor 520 are proportional to the area of the region where the detection wiring 510 and the signal line $V_{SL}$ overlap. In detail, the capacitance values $C_a$ of each coupling capacitor 520 are proportional to a wiring width $W_{line}$ of the detection wiring 510 and a wiring width $W_{SL}$ of the signal line $V_{SL}$. Therefore, in the present embodiment, the desired capacitance value $C_a$ can be easily realized by appropriately adjusting the wiring width $W_{line}$ of the detection wiring 510 and the wiring width $W_{SL}$ of the signal line $V_{SL}$.

Further, in the present embodiment, as illustrated in FIG. 8B, the shape of the detection wiring 510a may be changed so as to widen the wiring width $W_{line}$ of the detection wiring 510a in the region where the detection wiring 510 and the signal line $V_{SL}$ overlap. As described above, by changing the shape of the detection wiring 510a, it is possible to easily realize the desired capacitance value $C_a$ even when the signal lines $V_{SL}$ are arranged with a narrow pitch or a narrow wiring width.

As described above, in the present embodiment, the desired capacitance value $C_a$ can be easily realized by changing the wiring width and shape of the detection wiring 510 or the signal line $V_{SL}$. In addition, by providing the capacitor 540 or the like, the desired capacitance value $C_{tb}$ can be easily realized. Therefore, according to the present embodiment, since the capacitance values $C_a$ and $C_{tb}$ can be easily set to desired values, the saturation of the column signal processing unit 500b can be easily avoided. As a result, according to the present embodiment, the streaking amount can be more accurately detected without using the above-described HOPB pixel, so the streaking amount can be corrected and the streaking can be eliminated. In addition, according to the present embodiment, since the HOPB region 802 having the plurality of HOPB pixels is not provided, it is possible to suppress the increase in the chip area or the increase in power consumption.

<2.4 Layout of Column Signal Processing Unit 500b>

Figure 9:
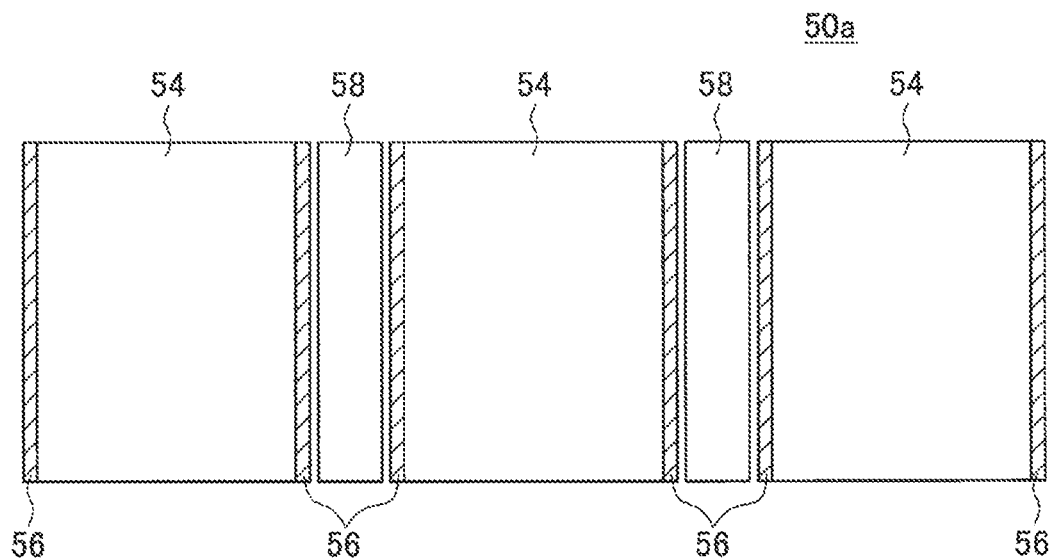
FIG. 9 is an explanatory diagram illustrating an example of a layout of a column signal processing region 50a according to a modification of the embodiment of the present disclosure.

Next, the layout of the column signal processing unit 500b according to the present embodiment will be described with reference to FIGS. 4A and 9. FIG. 9 is an explanatory diagram illustrating an example of a layout of the column signal processing region 50a according to the modification of the embodiment of the present disclosure.

As illustrated in FIG. 4A, one detection unit 52 is constituted by the column signal processing unit 500b according to the present embodiment together with a predetermined number (for example, about several thousand) of column signal processing units 500a. That is, the detection unit 52 is provided for every predetermined number of signal lines $V_{SL}$. Therefore, in the column signal processing region 50 according to the present embodiment, a predetermined number of column signal processing units 500a and column signal processing units 500b can be arranged so as to be alternately arranged. Further, in the present embodiment, since the column signal processing unit 500b and the column signal processing unit 500a have the same circuit configuration, in order to accurately form the same circuit configuration in the semiconductor manufacturing process, as described above, the column signal processing unit 500b and the column signal processing unit 500a are preferably arranged side by side as described above.

In the present embodiment, the column signal processing unit 500b having the same circuit configuration as the column signal processing unit 500a and the detection wiring 510 intersecting the signal line $V_{SL}$ have a simple configuration. Therefore, according to the present embodiment, the column signal processing units 500b and the detection wirings 510 can be provided on the image sensor 10 so as to be distributed more and uniformly without significantly increasing the chip area. As a result, according to the present embodiment, the column signal processing units 500b finely distributed on the image sensor 10 can detect even the streaking having the location dependence, and the streaking amount can be accurately corrected.

Further, in the present embodiment, the layout of the column signal processing unit 500b can be modified. For example, in FIG. 9 illustrating the modification of the present embodiment, the plurality of normal column regions (array regions) 54 in which the plurality of column signal processing units 500b are arranged are provided in the column signal processing region 50a of the image sensor 10, and a power wiring region 58 is provided therebetween. The power wiring region 58 is provided with a power supply wiring or accessory circuits such as a control circuit, a buffer circuit, and a bias voltage generation circuit. Further, in the present modification, the column signal processing unit 500b is provided in the additional column regions 56 provided at the left and right ends of the normal column region 54 in FIG. 9. In other words, in the present modification, the additional column regions 56 including the plurality of column signal processing units 500b are provided so that the normal column region 54 is sandwiched therebetween. Furthermore, the additional column regions 56 are provided so that the power wiring region 58 is sandwiched therebetween.

In general, when manufacturing the plurality of column signal processing units 500 arranged in a column in the semiconductor process, the column signal processing units 500 located at the end of the column may not have the desired circuit configuration due to misalignment or the like during the manufacturing. Therefore, one or more unused column signal processing units (not illustrated) (invalid columns) that are not electrically connected to the signal line $V_{SL}$ are often provided at the ends of the columns. Therefore, in the present modification, a part or all of the unused column signal processing units is diverted to the column signal processing unit 500b. By doing so, according to the present modification, it is possible to uniformly manufacture the plurality of column signal processing units 500a in the normal column region 54, and it is possible to form the column signal processing units 500b without using a special additional circuit.

As described above, according to the present embodiment and the present modification, the column signal processing unit 500b and the detection wiring 510 have a simple configuration, and can be provided on the image sensor 10 so as to be distributed more and uniformly without significantly increasing the chip area. As a result, according to the present embodiment, the column signal processing units 500b finely distributed on the image sensor 10 can detect even the streaking having the location dependence, and the streaking amount can be accurately corrected.

Note that in the above description, the column signal processing unit 500a and the column signal processing unit 500b are described as having the same circuit configuration, but the present embodiment is not limited thereto. For example, the constants of the configured circuit elements may differ depending on the coupling capacitors 520 and 530, the operating point, the input signal level, and the like. In such a case, the column signal processing unit 500b may not be provided at a location illustrated in FIGS. 4A and 9.

3. SUMMARY

As described above, according to the embodiment of the present disclosure, it is possible to provide a new image sensor (solid-state imaging device) 10 capable of eliminating the streaking.

Specifically, according to the embodiment of the present disclosure, by using the detection wiring 510 capacitively coupled to each of the plurality of signal lines $V_{SL}$, and the column signal processing unit 500b electrically connected to the detection wiring 510, the total sum of each pixel signals appearing on each signal line $V_{SL}$ can be detected. Therefore, according to the present embodiment, by using the total sum of each pixel signal appearing on each signal line $V_{SL}$ detected by the column signal processing unit 500b without using the above-described HOPB pixel, the generated streaking amount can be more accurately calculated. As a result, according to the present embodiment, the streaking can be eliminated by performing the correction using the streaking amount calculated as described above.

In addition, according to the present embodiment, since the HOPB region 802 having the plurality of HOPB pixels is not provided, it is possible to suppress the increase in the chip area or the increase in power consumption.

Further, according to the present embodiment, the desired capacitance value $C_a$ can be easily realized by changing the wiring width and shape of the detection wiring 510 or the signal line $V_{SL}$. In addition, by providing the capacitor 540 or the like, the desired capacitance value $C_{tb}$ can be easily realized. Therefore, according to the present embodiment, since the capacitance values $C_a$ and $C_{tb}$ can be easily set to desired values, the saturation of the column signal processing unit 500b can be easily avoided.

In addition, according to the present embodiment, the column signal processing unit 500b and the detection wiring 510 have a simple configuration, and can be provided on the image sensor 10 so as to be distributed more and uniformly without significantly increasing the chip area. As a result, according to the present embodiment, the column signal processing units 500b and the detection wiring 510 that are finely distributed on the image sensor 10 can detect even the streaking having the location dependence, and the streaking amount can be accurately corrected.

Note that in the embodiment of the present disclosure described above, the extending direction and the like of the signal line $V_{SL}$ is not limited to the up-down direction (column direction) in the figures, and for example, may be the left-right direction (row direction) in the figures. In this case, the layout of the column signal processing unit 500 and the like will be changed with the layout of the signal line $V_{SL}$ and the like.

4. APPLICATION EXAMPLE TO ELECTRONIC APPARATUS

The image sensor (solid-state imaging device) 10 according to the embodiment of the present disclosure described above can be applied to all the electronic apparatuses that use an image sensor for an image capturing unit such as an imaging device such as a digital still camera or a video camera, a mobile terminal device having an imaging function, or a copying machine using an image sensor for an image reading unit. Furthermore, the embodiments of the present disclosure can also be applied to a robot including the above-described imaging device, a drone, an automobile, a medical device (endoscope), and the like. Note that the image sensor 10 according to the present embodiment may be in the form of a one chip, or may be in the form of a module having an imaging function in which the imaging unit and the signal processing unit or the optical system are packaged in one.

Figure 10:
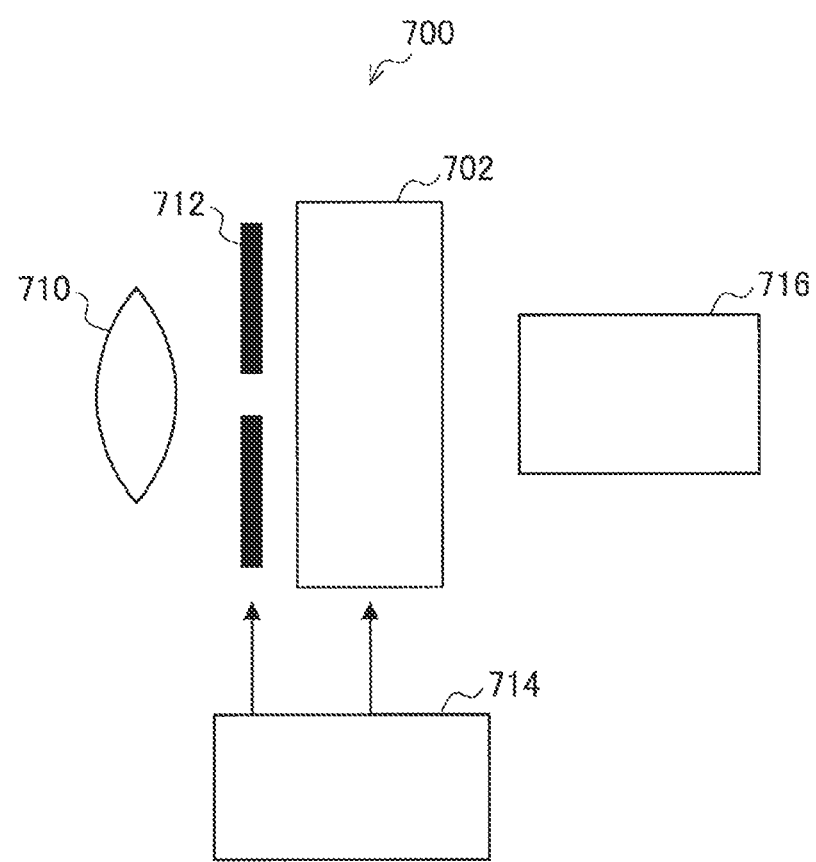
FIG. 10 is an explanatory diagram illustrating an example of an electronic apparatus 700 including an imaging device 702 having the image sensor 10 according to the embodiment of the present disclosure.

First, an example of an electronic apparatus 700 including an imaging device 702 having the image sensor 10 according to the embodiment of the present disclosure will be described with reference to FIG. 10. FIG. 10 is an explanatory diagram illustrating an example of an electronic apparatus 700 including an imaging device 702 having the image sensor 10 according to the embodiment of the present disclosure.

As illustrated in FIG. 10, the electronic apparatus 700 has the imaging device 702, an optical lens 710, a shutter mechanism 712, a drive circuit unit 714, and a signal processing circuit unit 716. The optical lens 710 forms image light (incident light) from a subject on an imaging surface of the imaging device 702. As a result, signal charges are accumulated in the image sensor 10 of the imaging device 702 for a certain period. The shutter mechanism 712 controls a light irradiation period and a light shielding period for the imaging device 702 by being opened and closed. The drive circuit unit 714 supplies a drive signal for controlling a signal transfer operation of the imaging device 702, a shutter operation of the shutter mechanism 712, or the like to the imaging device 702 and the shutter mechanism 712. That is, the imaging device 702 performs the signal transfer based on the drive signal (timing signal) supplied from the drive circuit unit 714. The signal processing circuit unit 716 performs various signal processing. For example, the signal processing circuit unit 716 outputs an image signal subjected to the signal processing to a storage medium (not illustrated) such as memory or to a display unit (not illustrated).

Further, the image sensor 10 according to the present embodiment is not limited to the image sensor that detects a distribution of an incident light amount of visible light and captures the detected visible light as an image. For example, the present embodiment can be applied to an image sensor that captures the distribution of the incident amount of infrared rays, X-rays, particles, or the like as an image, or an image sensor (physical quantity distribution detection device) such as a fingerprint detection sensor or the like that captures an image of a distribution of other physical quantities such as pressure and capacitance.

In addition, the image sensor 10 according to the present embodiment can be applied to various image sensors such as "an image sensor used in arbitrary mobile bodies such as an automobile, an electric vehicle, a hybrid electric vehicle, a motorcycle, a bicycle, personal mobility, an airplane, a drone, a ship, a robot, an artificial satellite, and a probe", "an industrial image sensor used in factories, logistics systems, and the like", "an image sensor used in intelligent transport systems (ITS)", "an image sensor for crime prevention". Further, the present embodiment can be applied to, for example, arbitrary devices including an image sensor, such as the above-described mobile bodies including the image sensor.

Hereinafter, an example in which the technologies according to the present embodiment is applied to the mobile bodies (for example, an automobile) will be described.

Figure 11:
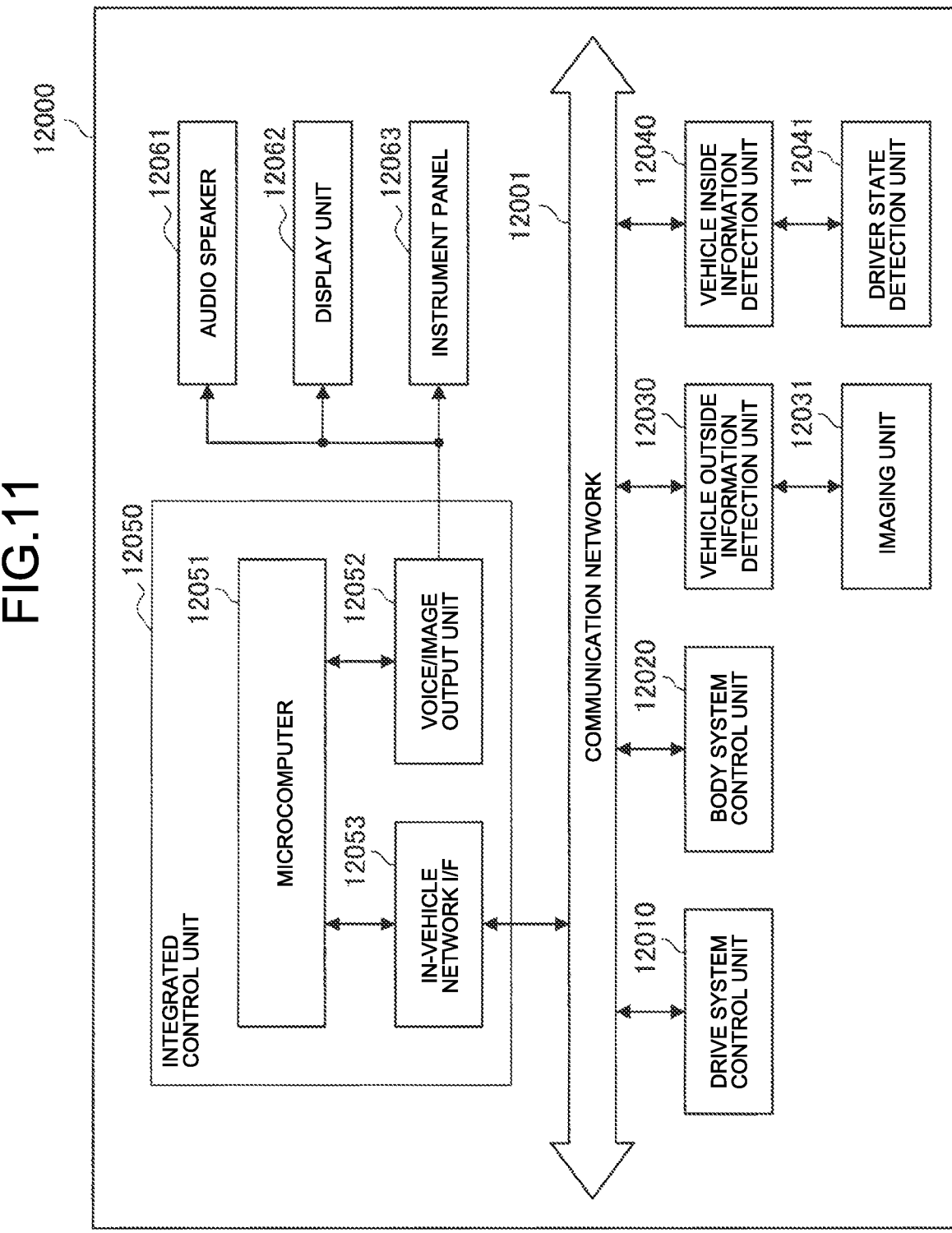
FIG. 11 is a block diagram illustrating an example of a schematic configuration of a vehicle control system.

FIG. 11 is a block diagram illustrating a schematic configuration example of a vehicle control system that is an example of a mobile body control system to which the technology according to the present disclosure can be applied.

A vehicle control system 12000 includes a plurality of electronic control units connected via a communication network 12001. In the example illustrated in FIG. 11, the vehicle control system 12000 includes a drive system control unit 12010, a body system control unit 12020, a vehicle outside information detection unit 12030, a vehicle inside information detection unit 12040, and an integrated control unit 12050. Further, a microcomputer 12051, a voice/image output unit 12052, and an in-vehicle network I/F (Interface)

12053 are illustrated as functional configurations of the integrated control unit 12050.

The drive system control unit 12010 controls an operation of devices related to a drive system of a vehicle according to various programs. For example, the drive system control unit 12010 is a driving force generation device that generates a driving force of a vehicle such as an internal combustion engine or a drive motor, a driving force transmission mechanism that transmits the driving force to wheels, a steering mechanism that adjusts a steering angle of the vehicle, and a control device such as a braking device that generates a braking force of the vehicle.

The body system control unit 12020 controls an operation of various devices mounted on a vehicle body according to various programs. For example, the body system control unit 12020 functions as a keyless entry system, a smart key system, a power window device, or a control device for various lamps such as a head lamp, a back lamp, a brake lamp, a blinker, or a fog lamp. In this case, the body system control unit 12020 can be input with radio waves that are transmitted from a portable device that substitutes for a key or signals of various switches. The body system control unit 12020 receives the input of these radio waves or signals and controls a door lock device, a power window device, a lamp, and the like of the vehicle.

The vehicle outside information detection unit 12030 detects information on an outside of the vehicle equipped with the vehicle control system 12000. For example, an imaging unit 12031 is connected to the vehicle outside information detection unit 12030. The vehicle outside information detection unit 12030 causes the imaging unit 12031 to capture an image of the outside of the vehicle and receives the captured image. The vehicle outside information detection unit 12030 may perform object detection processing or distance detection processing of a person, a car, an obstacle, a sign, characters on a road surface, or the like based on the received image.

The imaging unit 12031 is an optical sensor that receives light and outputs an electric signal according to a light receiving amount of the light. The imaging unit 12031 can output the electric signal as an image or as distance measurement information. In addition, the light received by the imaging unit 12031 may be visible light or invisible light such as infrared light.

The vehicle inside information detection unit 12040 detects information on an inside of the vehicle. The vehicle inside information detection unit 12040 is connected to, for example, a driver state detection unit 12041 that detects a driver state. The driver state detection unit 12041 includes, for example, a camera that captures a driver, and the vehicle inside information detection unit 12040 may calculate a degree of fatigue or concentration of the driver or may determine whether or not the driver is asleep, based on the detection information input from the driver state detection unit 12041.

The microcomputer 12051 may calculate a control target value of the driving force generation device, the steering mechanism, or the braking device based on the information on the inside and outside of the vehicle acquired by the vehicle outside information detection unit 12030 or the vehicle inside information detection unit 12040, and output a control command to the drive system control unit 12010. For example, the microcomputer 12051 can perform cooperative control to realize functions of an advanced driver assistance system (ADAS) including collision avoidance or impact mitigation of a vehicle, follow-up traveling based on inter-vehicle distance, vehicle speed maintenance traveling, a collision warning of a vehicle, a lane departure warning of a vehicle, or the like.

Further, the microcomputer 12051 can perform cooperative control to realize autonomous driving and the like that autonomously travels without depending on the operation of the driver by controlling the driving force generation device, the steering mechanism, the braking device, or the like based on the information around the vehicle acquired by the vehicle outside information detection unit 12030 or the vehicle inside information detection unit 12040.

Further, the microcomputer 12051 can output a control command to the body system control unit 12020 based on the information outside the vehicle acquired by the vehicle outside information detection unit 12030. For example, the microcomputer 12051 can control a head lamp according to a location of a preceding vehicle or an oncoming vehicle detected by the vehicle outside information detection unit 12030, and perform cooperative control to realize anti-glare such as switching a high beam to a low beam.

The voice/image output unit 12052 transmits an output signal of at least one of a voice and an image to an output device capable of visually or audibly notifying information to an occupant of the vehicle or the outside of the vehicle. In the example of FIG. 11, an audio speaker 12061, a display unit 12062, and an instrument panel 12063 are illustrated as the output device. The display unit 12062 may include at least one of an onboard display and a head-up display, for example.

Figure 12:
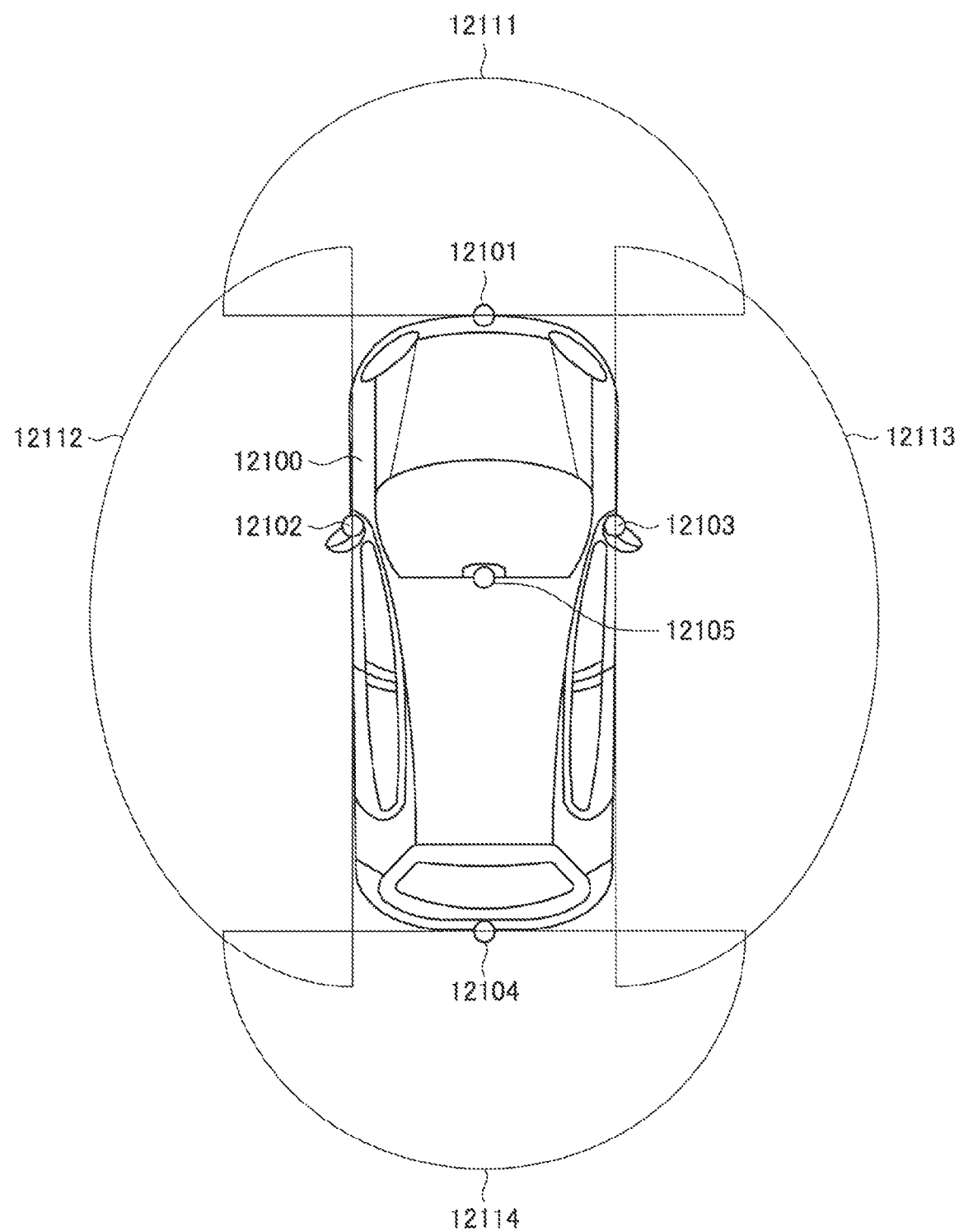
FIG. 12 is an explanatory diagram illustrating an example of installation positions of a vehicle outside information detection unit and an imaging unit.

FIG. 12 is a diagram illustrating an example of an installation location of the imaging unit 12031.

In FIG. 12, the imaging unit 12031 includes imaging units 12101, 12102, 12103, 12104, and 12105.

The imaging units 12101, 12102, 12103, 12104, and 12105 are provided at locations such as a front nose, side mirrors, a rear bumper, and a back door of a vehicle 12100 and an upper part of a windshield inside the vehicle. The imaging unit 12101 provided on the front nose and the imaging unit 12105 provided on the upper part of the windshield in the vehicle interior mainly acquire images in front of the vehicle 12100. The imaging units 12102 and 12103 provided on the side mirrors mainly acquire an image of the side of the vehicle 12100. The imaging units 12104 provided on the rear bump or the back door mainly acquire an image behind the vehicle 12100. The imaging unit 12105 provided in the upper part of the windshield inside the vehicle is mainly used for detecting a preceding vehicle, pedestrians, obstacles, traffic lights, traffic signs, lanes, or the like.

Note that FIG. 12 illustrates an example of an imaging range of the imaging units 12101 to 12104. An imaging range 12111 indicates an imaging range of the imaging unit 12101 installed on the front nose, imaging ranges 12112 and 12113 indicate imaging ranges of the imaging units 12102 and 12103 installed on the side mirrors, respectively, and an imaging range 12114 indicates an imaging range of the imaging unit 12104 installed on the rear bumper or the back door. For example, by overlaying the image data captured by the imaging units 12101 to 12104, a bird's-eye view of the vehicle 12100 viewed from above can be obtained.

At least one of the imaging units 12101 to 12104 may have a function of acquiring distance information. For example, at least one of the imaging units 12101 to 12104 may be a stereo camera including the plurality of imaging devices or may be an imaging device having pixels for phase difference detection.

For example, the microcomputer 12051 can extract, in particular, a closest three-dimensional object on a traveling path of the vehicle 12100, that is, a three-dimensional object traveling at a predetermined speed (for example, 0 km/h or more) in a substantially same direction as the vehicle 12100 as a preceding vehicle by obtaining a distance to each three-dimensional object in the imaging ranges 12111 to 12114 and a temporal change (relative velocity with respect to the vehicle 12100) in the distance based on the distance information obtained from the imaging units 12101 to 12104. Furthermore, the microcomputer 12051 can set an inter-vehicle distance to be secured in front of the preceding vehicle in advance, and can perform automatic brake control (including follow-up stop control) and automatic acceleration control (including follow-up start control). In this way, it is possible to perform cooperative control to realize autonomous driving or the like that autonomously travels without depending on an operation of a driver.

For example, the microcomputer 12051 can classify and extract three-dimensional object data regarding a three-dimensional object into other three-dimensional objects such as two-wheeled vehicles, ordinary vehicles, large vehicles, pedestrians, and telephone poles based on the distance information obtained from the imaging units 12101 to 12104, and can use the three-dimensional objects for automatic avoidance of obstacles. For example, the microcomputer 12051 distinguishes obstacles around the vehicle 12100 into obstacles that the driver of the vehicle 12100 can recognize and obstacles that the driver of the vehicle 12100 is difficult to recognize. Then, the microcomputer 12051 determines a collision risk which indicates the risk of collision with each obstacle, and outputs a warning to a driver via an audio speaker 12061 or a display unit 12062 or performs forced deceleration and avoidance steering through the drive system control unit 12010 when there is a possibility of collision that the collision risk exceeds the set value, thereby performing driving assistance for the collision avoidance.

At least one of the imaging units 12101 to 12104 may be an infrared camera that detects infrared light. For example, the microcomputer 12051 can recognize a pedestrian by determining whether or not the pedestrian exists in the captured images of the imaging units 12101 to 12104. The recognition of such a pedestrian is performed by, for example, a procedure of extracting the feature points in the captured image of the imaging units 12101 to 12104 as the infrared camera, and a procedure of determining whether there is a pedestrian by performing pattern matching processing on a series of feature points indicating a contour of the object. The microcomputer 12051 determines that a pedestrian exists in the captured images of the imaging units 12101 to 12104, and when the microcomputer 12051 recognizes a pedestrian, the voice/image output unit 12052 controls the display unit 12062 so that the recognized pedestrian overlays a rectangular contour line for emphasis. Further, the voice/image output unit 12052 may control the display unit 12062 to display an icon or the like indicating a pedestrian at a desired location.

Hereinabove, an example of the vehicle control system in the case where the technology according to the present embodiment is applied to a mobile body has been described. The technology according to the present embodiment can be applied to the imaging unit 12031 in the vehicle control system, for example. It goes without saying that the constituent element to which the technology according to the present embodiment is applied in the vehicle control system is not limited to the imaging unit 12031.

5. SUPPLEMENT

The preferred embodiments of the present disclosure have been described above in detail with reference to the accompanying drawings, but the present disclosure is not limited to such examples. It is obvious that a person having ordinary knowledge in the technical field of the present disclosure can conceive various changes or modifications within the scope of the technical idea described in the claims, and it is understood that the above changes or modifications also naturally belong to the technical scope of the present disclosure.

Further, the effects described in the present specification are merely explanatory or exemplifying ones, and are not limited. That is, the technology according to the present disclosure may achieve other effects apparent to those skilled in the art from the description of the present specification, in addition to or instead of the above effects.

The following configurations also belong to the technical scope of the present disclosure.

(1)

A solid-state imaging device comprising:

a plurality of pixels provided in a pixel region on a substrate in a matrix form;

a plurality of first wirings commonly provided to each of the plurality of pixels arranged along a first direction;

a second wiring capacitively coupled to each of the plurality of first wirings; and a second detection unit that is electrically connected to the second wiring and detects a second signal appearing on the second wiring.

(2)

The solid-state imaging device according to (1), further comprising:

a plurality of first detection units that are electrically connected to each of the first wirings and detect a first signal appearing on each of the first wirings.

(3)

The solid-state imaging device according to (2), wherein the plurality of first detection units and the second detection unit are analog-digital converters arranged in a detection unit region on the substrate.

(4)

The solid-state imaging device according to (3), wherein the plurality of first detection units and the second detection unit have the same circuit configuration.

(5)

The solid-state imaging device according to (4), wherein the second wiring is electrically connected to a bias circuit via a switch.

(6)

The solid-state imaging device according to any one of (2) to (5), further comprising:

a processing unit that estimates a noise amount based on a signal amount detected by the second detection unit, and corrects a signal amount detected by the plurality of first detection units using the estimated noise amount.

(7)

The solid-state imaging device according to any one of (1) to (6), wherein a first capacitance value of a first coupling capacitor generated by capacitively coupling the first wiring and the second wiring is proportional to an area of a region in which the first wiring and the second wiring overlay each other.

(8)

The solid-state imaging device according to (7), further comprising:

a capacitor that is electrically connected to the second wiring and has a second capacitance value.

(9)

The solid-state imaging device according to (7), wherein the second wiring is capacitively coupled to a third wiring to generate a second coupling capacitor having a second capacitance value.

(10)

The solid-state imaging device according to (8) or (9), wherein the second capacitance value is greater than the first capacitance value.

(11)

The solid-state imaging device according to any one of (1) to (10), wherein each of the first wirings extends along the first direction on the substrate, and the second wiring extends along a second direction orthogonal to the first direction on the substrate.

(12)

The solid-state imaging device according to (3), wherein a plurality of the second wirings and a plurality of the second detection units are provided, and each of the second wirings is capacitively coupled to a predetermined number of first wirings.

(13)

The solid-state imaging device according to (12), wherein in the detection unit region, the predetermined number of first detection units are alternately arranged to the second detection units.

(14)

The solid-state imaging device according to (3), wherein a plurality of the second wirings and a plurality of the second detection units are provided, and the second detection units are provided so that an array region in which the plurality of first detection units are arranged is sandwiched therebetween.

(15)

The solid-state imaging device according to (3), wherein the pixel region is provided on a first surface of the substrate, and the detection unit region is provided on a second surface of the substrate different from the first surface.

(16)

The solid-state imaging device according to (3), wherein the pixel region is provided on a first substrate, and the detection unit region is provided on a second substrate different from the first substrate.

(17)

The solid-state imaging device according to any one of (1) to (16), further comprising:

a load device region in which a plurality of load devices each electrically connected to each of the first wirings are arranged on the substrate.

(18)

An electronic apparatus comprising a solid-state imaging device, wherein the solid-state imaging device includes:

a plurality of pixels provided in a pixel region on a substrate in a matrix form;

a plurality of first wirings commonly provided to each of the plurality of pixels arranged along a first direction;

a second wiring capacitively coupled to each of the plurality of first wirings; and a second detection unit that is electrically connected to the second wiring and detects a second signal appearing on the second wiring.

REFERENCE SIGNS LIST 10, 80 IMAGE SENSOR
20 PIXEL ARRAY REGION
30 VERTICAL DRIVE CIRCUIT REGION
40 LOAD DEVICE REGION
50, 50a, 804 COLUMN SIGNAL PROCESSING REGION
52, 52a DETECTION UNIT
54 NORMAL COLUMN REGION
56 ADDITIONAL COLUMN REGION
58 POWER WIRING REGION
60 HORIZONTAL DRIVE CIRCUIT REGION
70 OUTPUT CIRCUIT UNIT
90 BROKEN LINE
100 PIXEL
200 HORIZONTAL SIGNAL LINE
300 SEMICONDUCTOR SUBSTRATE
400 LOAD DEVICE
500a-1, 500a-2, 500a-k, 500b COLUMN SIGNAL PROCESSING UNIT
502 COMPARATOR
504 UP/DOWN COUNTER
506 MEMORY
508 TRANSFER SWITCH
510, 510a DETECTION WIRING
512 SWITCH
520, 520-1, 520-2, 520-k, 530-1, 530-2, 530-k COUPLING CAPACITOR
540 CAPACITOR
600 STRAIGHT LINE
602 CURVED LINE
604 RANGE
700 ELECTRONIC APPARATUS
702 IMAGING DEVICE
710 OPTICAL LENS
712 SHUTTER MECHANISM
714 DRIVE CIRCUIT UNIT
716 SIGNAL PROCESSING CIRCUIT UNIT
800 NORMAL PIXEL REGION
802 HOPB REGION
900 INPUT IMAGE
902 OUTPUT IMAGE
12000 VEHICLE CONTROL SYSTEM
12001 COMMUNICATION NETWORK
12010 DRIVE SYSTEM CONTROL UNIT
12020 BODY SYSTEM CONTROL UNIT
12030 VEHICLE OUTSIDE INFORMATION DETECTION UNIT
12031, 12101, 12102, 12103, 12104, 12105 IMAGING UNIT
12040 VEHICLE INSIDE INFORMATION DETECTION UNIT
12041 DRIVER STATE DETECTION UNIT
12050 INTEGRATED CONTROL UNIT 12050
12051 MICROCOMPUTER
12052 VOICE/IMAGE OUTPUT UNIT
12053 IN-VEHICLE NETWORK I/F (INTERFACE)
12061 AUDIO SPEAKER
12062 DISPLAY UNIT
12063 INSTRUMENT PANEL
12100 VEHICLE
12111, 12112, 12113, 12114 IMAGING RANGE

The invention claimed is:

1. A solid-state imaging device, comprising:
   a plurality of pixels in a pixel region on a substrate in a matrix form;
   a plurality of first wirings commonly provided to each pixel of the plurality of pixels arranged along a first direction;
   a second wiring capacitively coupled to each first wiring of the plurality of first wirings;
   a plurality of first detection units electrically connected to each first wiring of the plurality of first wirings, wherein the plurality of first detection units is configured to detect a first signal that appears on each first wiring of the plurality of first wirings;
   a second detection unit electrically connected to the second wiring, wherein the second detection unit is configured to:
      detect a second signal that appears on the second wiring; and
      detect a sum of a plurality of first signals that appears on each first wiring of the plurality of first wirings; and
   a processing unit configured to:
      estimate a noise amount based on an average of the detected sum of the plurality of first signals that appears on each first wiring of the plurality of first wirings; and
      correct a signal amount corresponding to the detected first signal based on the estimated noise amount.

2. The solid-state imaging device according to claim 1, wherein the plurality of first detection units and the second detection unit are analog-digital converters in a detection unit region on the substrate.

3. The solid-state imaging device according to claim 2, wherein the pixel region is on a first substrate,
   the detection unit region is on a second substrate, and
   the second substrate is different from the first substrate.

4. The solid-state imaging device according to claim 1, further comprising:
   a load device region in which a plurality of load devices is arranged on the substrate, wherein each load device of the plurality of load devices is electrically connected to each first wiring of the plurality of first wirings.

5. The solid-state imaging device according to claim 1, wherein the plurality of first detection units and the second detection unit have same circuit configuration.

6. The solid-state imaging device according to claim 1, wherein the second wiring is electrically connected to a bias circuit via a switch.

7. The solid-state imaging device according to claim 1, wherein a first capacitance value of a first coupling capacitor generated based on capacitively coupling each first wiring of the plurality of first wirings and the second wiring is proportional to an area of a region in which the plurality of first wirings and the second wiring overlay each other.

8. The solid-state imaging device according to claim 7, further comprising:
   a capacitor that is electrically connected to the second wiring and has a second capacitance value.

9. The solid-state imaging device according to claim 8, wherein the second capacitance value is greater than the first capacitance value.

10. The solid-state imaging device according to claim 7, wherein the second wiring is capacitively coupled to a third wiring to generate a second coupling capacitor having a second capacitance value.

11. The solid-state imaging device according to claim 1, wherein
   each first wiring of the plurality of first wirings extends along the first direction on the substrate, and
   the second wiring extends along a second direction orthogonal to the first direction on the substrate.

12. The solid-state imaging device according to claim 1, further comprising:
   a plurality of second wirings; and
   a plurality of second detection units, wherein
   each second wiring of the plurality of second wirings is capacitively coupled to a specific number of first wirings of the plurality of first wirings.

13. The solid-state imaging device according to claim 12, wherein a specific number of first detection units of the plurality of first detection units are alternately arranged to the plurality of second detection units in a detection unit region on the substrate.

14. The solid-state imaging device according to claim 1, further comprising:
   a plurality of second wirings; and
   a plurality of second detection units, wherein
   an array region in which the plurality of first detection units is sandwiched between the plurality of second detection units.

15. The solid-state imaging device according to claim 2, wherein
   the pixel region is on a first surface of the substrate,
   the detection unit region is on a second surface of the substrate, and
   the second surface is different from the first surface.

16. An electronic apparatus, comprising:
   a solid-state imaging device, wherein the solid-state imaging device includes:
      a plurality of pixels in a pixel region on a substrate in a matrix form;
      a plurality of first wirings commonly provided to each pixel of the plurality of pixels arranged along a first direction;
      a second wiring capacitively coupled to each first wiring of the plurality of first wirings;
      a plurality of first detection units electrically connected to each first wiring of the plurality of first wirings, wherein the plurality of first detection units is configured to detect a first signal that appears on each first wiring of the plurality of first wirings;
      a second detection unit electrically connected to the second wiring, wherein the second detection unit is configured to:
         detect a second signal that appears on the second wiring; and
         detect a sum of a plurality of first signals that appears on each first wiring of the plurality of first wirings; and
      a processing unit configured to:
         estimate a noise amount based on an average of the detected sum of the plurality of first signals that appears on each first wiring of the plurality of first wirings; and
         correct a signal amount corresponding to the detected first signal based on the estimated noise amount.

17. A solid-state imaging device, comprising:
   a plurality of pixels in a pixel region on a substrate in a matrix form;

a plurality of first wirings commonly provided to each pixel of the plurality of pixels arranged along a first direction;

a first detection unit electrically connected to each of the plurality of first wirings;

a second wiring capacitively coupled to each first wiring of the plurality of first wirings; and a second detection unit electrically connected to the second wiring, wherein the second detection unit is configured to detect a second signal that appears on the second wiring, wherein a first capacitance value of a first coupling capacitor generated based on capacitively coupling each first wiring of the plurality of first wirings and the second wiring is proportional to an area of a region in which the plurality of first wirings and the second wiring overlay each other.

18. The solid-state imaging device according to claim 17, further comprising:

a capacitor that is electrically connected to the second wiring and has a second capacitance value, wherein the second capacitance value is greater than the first capacitance value.

19. The solid-state imaging device according to claim 17, wherein the second wiring is capacitively coupled to a third wiring to generate a second coupling capacitor having a second capacitance value.

* * * * *